US007304985B2

(12) United States Patent
Sojka et al.

(10) Patent No.: US 7,304,985 B2
(45) Date of Patent: Dec. 4, 2007

(54) MULTIMEDIA COMMUNICATION MANAGEMENT SYSTEM WITH LINE STATUS NOTIFICATION FOR KEY SWITCH EMULATION

(76) Inventors: Marvin L Sojka, 41503 Mill Creek Rd., Magnolia, TX (US) 77354; Christopher Lyle Adams, 6130 Mountainwell Dr., Roswell, GA (US) 30075; Calvin E Lewis, 3760 Fairway Park Dr., Suite 206, Copley, OH (US) 44321; Rodney A Ross, 3076 Ridgewood Rd., Fairlawn, OH (US) 44333; Robert M Nebiker, 5948 Sand Wedge La. #903, Naples, FL (US) 34110

( * ) Notice: Subject to any disclaimer, the term of this patent is extended or adjusted under 35 U.S.C. 154(b) by 944 days.

(21) Appl. No.: 10/624,255

(22) Filed: Jul. 22, 2003

(65) Prior Publication Data
US 2004/0114577 A1    Jun. 17, 2004

Related U.S. Application Data

(63) Continuation-in-part of application No. 11/057,713, filed on Feb. 14, 2005, and a continuation-in-part of application No. 10/000,543, filed on Oct. 23, 2001, now Pat. No. 7,054,416, and a continuation-in-part of application No. 09/961,532, filed on Sep. 24, 2001, now Pat. No. 6,912,283.

(51) Int. Cl.
*H04L 12/66* (2006.01)

(52) U.S. Cl. .................. 370/352; 370/493; 709/245

(58) Field of Classification Search ............... 370/352, 370/525, 493, 250; 709/245
See application file for complete search history.

(56) References Cited

U.S. PATENT DOCUMENTS

| | | | | |
|---|---|---|---|---|
| 6,665,293 | B2 * | 12/2003 | Thornton et al. | 370/352 |
| 7,035,289 | B2 * | 4/2006 | Devine et al. | 370/493 |
| 7,120,122 | B1 * | 10/2006 | Starr et al. | 370/250 |
| 2001/0012305 | A1 * | 8/2001 | Kozdon et al. | 370/525 |
| 2003/0093563 | A1 * | 5/2003 | Young et al. | 709/245 |

\* cited by examiner

*Primary Examiner*—Chi Pham
*Assistant Examiner*—Albert T. Chou
(74) *Attorney, Agent, or Firm*—Timothy P. O Hagan

(57) ABSTRACT

A communication management system operates with a packet switched local area network and includes a PSTN interface for communicating over a telephone line with a service provider central office. The system comprises means for establishing a logical channel over the packet switched local area network to support a real time communication session with a real time communication device in response to receiving session signaling from the real time communication device; means for controlling the PSTN interface to transition the telephone line to an off hook state in response to receiving session signaling; and translation means for providing digital audio over the logical channel, the digital audio representing a dial tone received on the telephone line from the central office and providing one of a plurality of dual tone multi frequency signals on the telephone line in response to receipt of data from the real time communication device corresponding to the one of a plurality of dual tone multi frequency signals.

12 Claims, 23 Drawing Sheets

| Identifier 246 | | Routing Address 254 | | Reference |
|---|---|---|---|---|
| Identifier | Name / URL | IP Address 254a | Port # 254b | Identifier 248 |
| 1001 | Outside Line 1 | 192.168.001.001 | | --- |
| 1002 | Outside Line 2 | 192.168.001.002 | | --- |
| 1003 | Outside Line 3 | 192.168.001.003 | | --- |
| 1004 | Bob | | | 1006 |
| 1005 | Marvin | | | Voice Mail |
| 1006 | Bob's Subscriber Device | | | Voice Mail |
| 1007 | | | | |
| 1008 | | | | |
| 1009 | | | | |

| Conference Session A | | | | | |
|---|---|---|---|---|---|
| Participant Name 293 | Identifier 294 | Security Status 295 | Audio Status 296 | Video Status 297 | Video Display Mix Selection 298 |
| Annette | | | | | |
| Bill | | | | | |
| Charlie | | | | | |
| Dave | | | | | |
| Edward | | | | | |
| Fred | | | | | |
| Gretchen | | | | | |
| Helga | | | | | |
| Irene | | | | | |

Figure 13

| Resource Status Table | | | |
|---|---|---|---|
| Resource ID 145 | Notice Server ID 143 | Subscription Expiration 148 | Status 177 |
| 145a | | | |
| 145b | | | |
| 145c | | | |
| | | | |
| | | | |

Subscription Message 140 | Notice Server ID 143 | Notice Client ID 144 | Resource ID 145

143a: IP Address and Port #
143b: Identifier
144a: IP Address and Port #
144b: Identifier

Figure 24b

Subscription Acknowledge Message 141 | Notice Client ID 144 | Resource ID 145 | Expiration 148

Figure 24c

Notice Message 142 | Notice Client ID 144 | Resource ID 145 | Resource Status 149

MULTIMEDIA COMMUNICATION MANAGEMENT SYSTEM WITH LINE STATUS NOTIFICATION FOR KEY SWITCH EMULATION

CROSS REFERENCE TO RELATED APPLICATIONS

The present application is a continuation in part of U.S. patent application Ser. No. 09/961,532 titled Teledata Space and Docking Station with Modular and Integrated Display filed on Sep. 24, 2001 now U.S. Pat. No. 6,912,283, and is a continuation in part of U.S. patent application Ser. No. 10/000,543 filed on Oct. 23, 2001 now U.S. Pat. No. 7,054,416, titled Modular Multi-Media Communication Management System, and is a continuation in part of U.S. patent application Ser. No. 11/057,713 filed on Feb. 14, 2005 titled Multi-Media Communication Management System with Graphical User Interface Conference Session Management, the contents of such patent applications is incorporated herein.

TECHNICAL FIELD

The present invention relates generally to managing multi-media communications, and more particularly to a packet-switched communication system with key switch system emulation.

BACKGROUND OF THE INVENTION

In an office environment, desk top telephone service, voice mail service, and fax service is typically provided by a private telephone communication system. Private telephone systems comprises key switch systems, private exchange (PBX) systems, and more recently, voice-over-internet-protocol (VOIP) systems.

A key switch system consists of central key switch unit and a plurality of desk top telephones and fax machines. Each telephone is coupled to the key switch unit by a subscriber loop running from the telephone to the key switch unit. Communication between each desk top telephone and the key switch unit typically utilizes plain old telephone service (POTS) signaling.

The key switch unit may be coupled to a voice mail server by a proprietary interface. The key switch unit is further coupled to the public switched telephone network (PSTN) using trunk lines that are connected to a central office switch that is typically managed by the local telephone service provider.

Each telephone includes a plurality of buttons (and illuminated indicators), each being associated with one extension or one of the trunk lines to the central office. When an extension or a trunk line is in use, the indicator associated with that extension will be illuminated on all of the other telephones such that the operators can view which extensions and trunks are in use, and which are available. When an operator desires to telephone another extension, he or she will activate the button associated with the other extension. When an operator desires to telephone a subscriber loop of the PSTN, the operator first activates a button associated with an outside line (which will cause the key switch unit to couple an outside line to the operator's extension giving the operator's extension a PSTN dial tone) and then dial the number.

A PBX system comprises a switching network, a plurality of desk top telephones, and a voice mail server. The voice mail server is typically coupled to the switching network using a proprietary interface. Each desk top telephone and fax machine is coupled to the switching network by an extension line that consists of twisted pair conductors that are terminated by a telephone jack in the office. Communication between the desk top telephone and the switching network over each extension line utilizes either proprietary digital signaling or plain old telephone service (POTS) signaling. The switching network is further coupled to the public switched telephone network (PSTN) using trunk lines that are connected to a central office switch that is typically managed by the local telephone service provider. The switching network controls calls between extensions and between an extension and a remote destination via a trunk line coupled to the PSTN.

PBX systems do not typically have a button associated with each extension on each telephone. Instead, operators dial each other's extension numbers for placing internal calls and typically dial "9" to get an outside line for placing calls over the PSTN.

VOIP systems utilize a central gateway and a plurality of VOIP telephone stations. Each station is coupled to a packet switched network (such as an Ethernet network) that interconnects each station with the central gateway. The central gateway and each telephone station typically is assigned an IP address and communications between two extensions and between an extension and the gateway typically is over UDP/IP channels. Because of the wide spread acceptance of PBX systems, VOIP systems typically are configured such that operators dial each other's extension numbers for placing internal calls and typically dial "9" to indicate a call to be placed over the PSTN.

It is generally recognized the dialing of extension numbers and dialing "9" for an outside line has several advantages over key systems, particularly in larger office environments where there are many extensions. However, in a small office environment, key switch systems have some advantages over PBX systems.

First, each operator can quickly determine whether another operator is on the telephone without having to first attempt to place a call and receive a busy signal (or roll to voice mail) if the operator is on the telephone. Secondly, each operator can quickly determine whether an outside line is available without having to first try to place a call and receive a busy signal if an outside line is not available. Thirdly, an incoming call on one of the trunk lines can typically be answered by any extension simply by activating the button associated with the ringing trunk line.

What is needed is a communication management system that provides a typical key switch user experience while providing the flexibility of VOIP networking.

SUMMARY OF THE INVENTION

A first aspect of the present invention is to provide a communication management system for operation with a packet switched local area network. The communication management system may comprise a PSTN interface for communicating over a telephone line with a service provider central office and a network interface for communicating over the packet switched local area network with at least one real time communication device. The system may include a PSTN gateway that comprises: i) means for establishing a logical channel over the packet switched local area network to support a real time communication session with a real time communication device in response to receiving session signaling from the real time communication device ii) means for controlling the PSTN interface to transition the telephone line to an off hook state in response to receiving session signaling; and iii) translation means for providing digital audio over the logical channel, the digital audio representing a dial tone received on the telephone line from the central office and providing one of a plurality of dual tone multi frequency signals on the telephone line in response to receipt of data from the real time communication device corresponding to the one of a plurality of dual tone multi frequency signals.

The session signaling may be sent to a logical port associated with the telephone line and may identify a local area network address associated with the real time communication device.

The data from the real time communication device corresponding to the one of a plurality of dual tone multi frequency signals may be compressed digital audio data provided on the logical channel and representing at least one of an analog or digital audio representation of the tone generated at the real time communication device. Alternatively, the data form the real time communication device corresponding to the one of a plurality of dual tone multi frequency signals may be a message identifying the tone.

The system may further comprise a proxy server that includes: i) means for receiving a session signaling message from the real time communication device that includes an identifier associated with the telephone line; ii) means for determining a logical port associated with the telephone line; iii) means for adding the logical port to the a destination address of the session signaling message to generate a translated session signaling message; and iv) means providing the session signaling message to the PSTN gateway on the logical port.

A second aspect of the present invention is to provide a method for providing a communication interface between a telephone line coupled between a control unit and a public switched telephone network (PSTN) service provider central office and a logical channel between the control unit and a real time communication device over a packet switched local area network. The method comprises: i) receiving session signaling over the local area network on a logical port associated with the telephone line, the session signaling identifying a local area network address associated with the initiating real time communication device; ii) establishing a logical channel over the local area network to support a media session with the real time communication device; iii) transitioning the telephone line to an off hook state; iv) providing digital audio over the logical channel, the digital audio representing a dial tone received on the telephone line from the central office; and v) providing one of a plurality of dual tone multi frequency signals on the telephone line in response to receipt of data from the real time communication device corresponding to the one of a plurality of dual tone multi frequency signals.

The data from the real time communication device corresponding to the one of a plurality of dual tone multi frequency signals may be compressed digital audio data provided on the logical channel and representing at least one of an analog or digital audio representation of the tone generated at the real time communication device. As such, the step of providing one of a plurality of dual tone multi frequency signals on the telephone line would include decompressing compressed digital audio data provided on the logical channel and representing generation of the dual tone multi frequency signal at the real time communication device.

Alternatively, the data form the real time communication device corresponding to the one of a plurality of dual tone multi frequency signals may be a message identifying the tone. As such, the step of providing one of a plurality of dual tone multi frequency signals on the telephone line would include providing the signal in response to receipt of a message from the real time communication device identifying the tone.

The method may further comprise the following steps performed by a proxy server: i) receiving a session signaling message from the real time communication device that includes an identifier associated with the telephone line; ii) determining a logical port associated with the telephone line; iii) adding the logical port to the a destination address of the session signaling message to generate a translated session signaling message; and iv) providing the session signaling message to the PSTN gateway on the logical port.

For a better understanding of the present invention, together with other and further aspects thereof, reference is made to the following description, taken in conjunction with the accompanying drawings. The scope of the invention is set forth in the appended clams.

BRIEF DESCRIPTION OF THE DRAWINGS

FIG. 6 is an exemplary routing table;

FIG. 13 represents an exemplary session status table;

FIG. 23 represents an exemplary resource status table; and

FIGS. 24a, 24b, and 24c represent exemplary messages.

DESCRIPTION OF THE PREFERRED EMBODIMENTS

Figure 1:
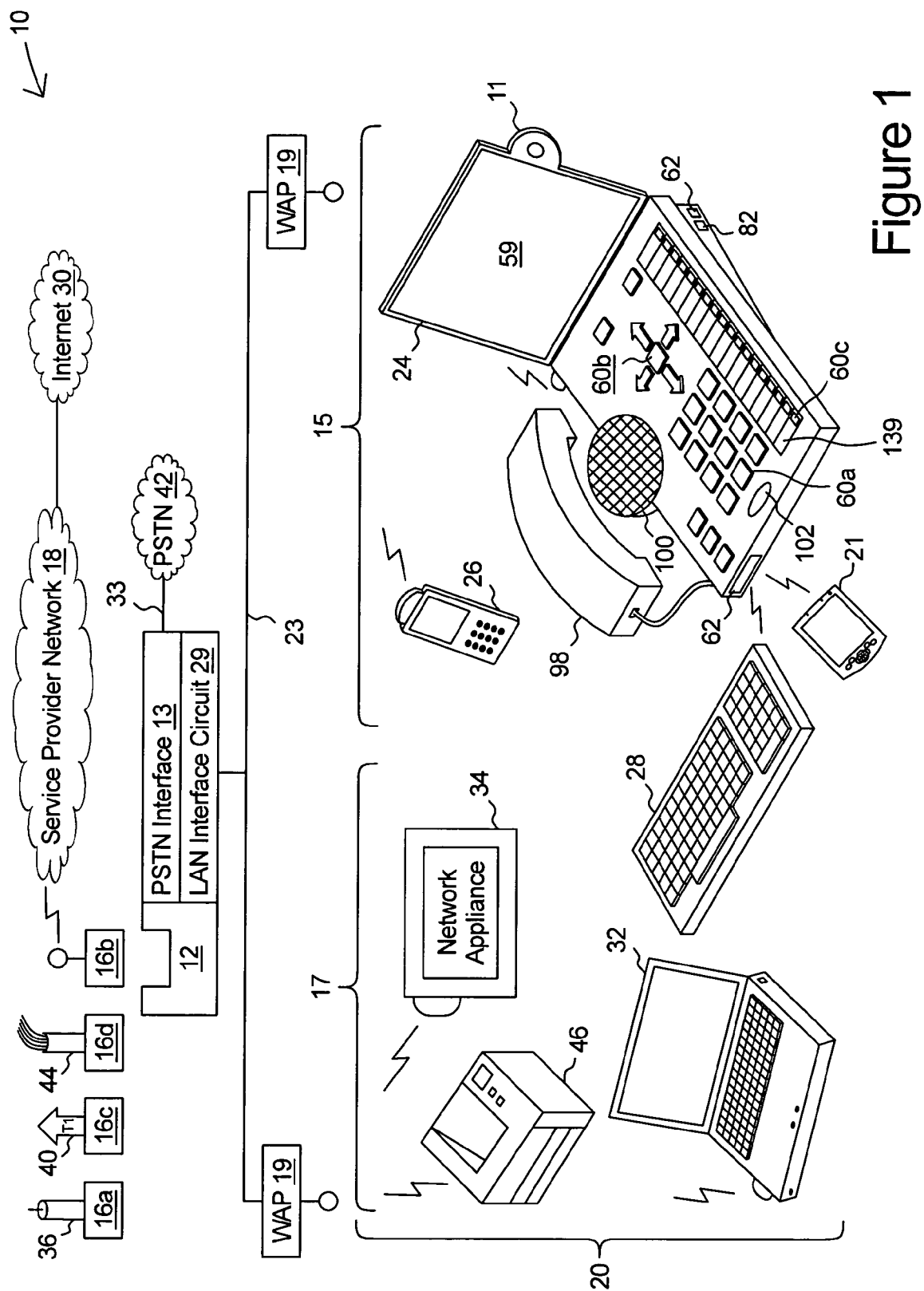
FIG. 1 is a block diagram representing a multi-media communication management system in accordance with one embodiment of the present invention.

The present invention is now described in detail with reference to the drawings. In the drawings, each element with a reference number is similar to other elements with the same reference number independent of any letter designation following the reference number.

It should also be appreciated that many of the elements discussed in this specification may be implemented in hardware circuit(s), a processor executing software code, or a combination of a hardware circuit and a processor executing code. As such, the term circuit or module as used throughout this specification is intended to encompass a hardware circuit (whether discrete elements or an integrated circuit block), a processor executing code, or a combination of a hardware circuit and a processor executing code, or other combinations of the above known to those skilled in the art.

FIG. 1, is a diagram representing an architecture of a multi-media communication management system 10 of the present invention. The system 10 is coupled to both of a multi-media service provider network 18 and the public switched telephone network (PSTN) 42.

The service provider network 18 may be TCP/IP compliant and utilize a combination of one or more of co-axial cable, fiber optic cable, T1 lines, and wireless RF channels as its physical communication medium. The service provider network 18 may couple to the Internet 30 through appropriate gateways and/or routers to enable system 10 to communicate with TCP/IP compliant devices coupled to the service provider network 18 or the Internet 30 (collectively, remote TCP/IP compliant devices).

The system 10 includes a control unit 12, a plurality of network devices 20, a plurality of personal data devices 21, and a wireless local area network 22 that interconnects the network devices 20 to each other and to the control unit 12.

The wireless local area network 22 may be a TCP/IP compliant packet switched network and utilize a combination of a wired backbone network 23 (such as an Ethernet Network) and micro-cellular RF cells as its physical communication medium. Each micro-cellular RF cell may be an 802.11 compliant wireless cell controlled by an access point 19 that is uplink coupled to the backbone network 23 or wirelessly uplink coupled to another access point 19.

The control unit 12 includes a LAN interface circuit 29 for coupling to the local area network 22 and enabling communication with network devices 20, a PSTN interface circuit 13 for coupling to the PSTN 42 (e.g coupling to multiple telephone lines from a telephone service provider central office) and enabling communication with remote PSTN devices coupled to the PSTN 42, and a modular service provider interface 16 for coupling to the service provider network 18 and enabling communication with remote TCP/IP compliant devices.

The network devices 20 may include data devices 17 such as traditional computer systems 32, network printers 46, various network appliances 34 and real time communication devices 15 such as subscriber telephony stations 24 and wirelessly telephony devices 26.

Each personal data device (PDA) 21 may be similar to a commercially available device known as a Personal Data Assistant (PDA), or a commercially available cellular or PCS telephone with PDA capabilities, and may include a point-to-point communication system 62 for communication with a corresponding point-to-point communication system 62 within a station 24.

Subscriber Stations

Each telephony station 24 is configured to provide a subscriber interface that includes aspects of a user interface of a key switch private telephone system. More specifically, each telephony station 24 comprises a plurality of LED or LCD indicators 139 each associated with one of the other real time communication devices 15 of the system 10 or one of the plurality telephone lines 33 coupling the control unit 12 to the PSTN 42 (e.g. an outside line). The indicator 139 indicates the "on-hook" or "off-hook" status of such other real time communication device 15 or the PSTN outside line 33.

Associated with each indicator 139 is a single one of the plurality of selection buttons 60c that may be activated by the user of station 24 to initiate a real time communication session to the real time communication device 15 associated with the indicator 139 or to a particular logical port number of the PSTN gateway 131 (FIG. 5) for establishing a real time communication channel over the outside line 33 associated with the indicator 139.

Also included in each telephone station 24 are a speaker 100 and a microphone 102 for providing a "speaker phone" dialog interface, a handset 98 for providing a traditional handset dialog interface, a display screen or touch panel display screen 59, a plurality of buttons 60a arranged as a traditional telephone keypad, and a plurality of buttons 60b arranged for menu navigation and selection from the display 59.

Figure 2:
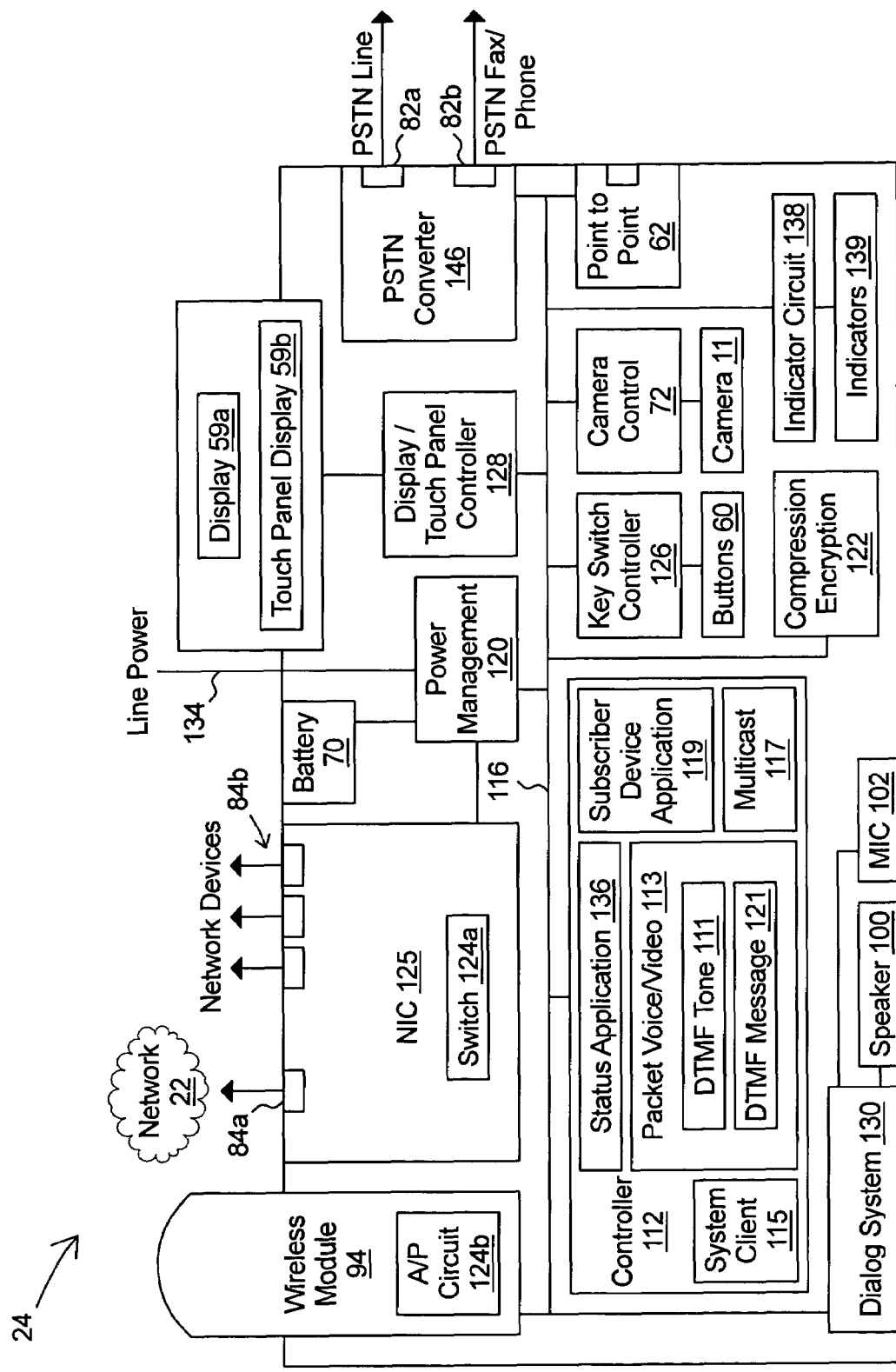
FIG. 2 is a block diagram representing an exemplary subscriber telephony station.

Referring to the block diagram of FIG. 2 in conjunction with FIG. 1, exemplary structure of the telephony station 24 is shown. The station 24 may include a controller 112 and a plurality of peripheral circuits coupled to the controller 12 via a local bus 116. The peripheral circuits may include a wireless module 94, an network interface circuit (NIC) 125, a power management controller 120, compression/encryption hardware (CODEC) 122, a key switch controller 126, a display/touch panel controller 128, a camera controller 72, a indicator circuit 138, a PSTN converter 146, a dialog system 130, and at least one point-to-point wireless communication module 62.

The dialog system 130 may be coupled between the bus 116 and the handset 98 (and the speaker 100 and microphone 102) and may include applicable circuits for: i) driving the speaker 100 (or the speaker in the handset 98) in accordance with digital audio received from the CODEC 122 and ii) detecting input from the microphone 102 (or the microphone in the handset 98) and generating digital audio for presentation of the CODEC 122.

The power management controller 120 selectively receives input power from a battery 70, external power source 134, and/or the backbone network 23 via the network interface circuit 125. The power management controller 120 includes appropriate circuits for converting the input power to appropriate operating power required by each component of the station 24. Additionally, the power management controller 120 includes appropriate circuits for managing charging of the battery 70 when power is available from the external power source 134 or the backbone network 23.

The display/touch panel controller 128 couples to the bus 116, operates under control of applicable drivers operated by the controller 112, and enables the display 59*a* (or the touch panel display 59*b*) to provide information to the subscriber (and receive subscriber input through the touch panel display 59*b*). In the exemplary embodiment, the display/touch panel controllers 128 may include a separate display control circuit compatible with the resolution and color depth of the display 59*a* or 59*b* and a touch panel control circuit for detecting subscriber contact with the touch panel 59*b*.

The camera controller 72 couples to the bus 116, operates under control of applicable drivers operated by the controller 112, and generates digital still image or motion video signals for presentation to the CODEC 112 for transmission to another endpoint during a VOIP media session and/or for presentation to another applicable application operated by the controller 112 for display on the display 59.

The key switch controller 126 couples to the bus 116, operates under control of applicable drivers operated by the controller 112, and enables the controller 112 to receive subscriber input through the buttons 60.

The wireless point-to-point communication module 62 couples to the bus 116 (either directly or through an interface circuit such as a serial communication controller), operates under control of applicable drivers operated by the controller 112, and enables synchronization of data between the station 24 and the PDA 21 and enables operation of the keyboard 28 (both the PDA 21 and the keyboard 28 include a corresponding wireless point-to-point communication module 62).

Exemplary point-to-point communication modules 62 include known modules that couple to a bus 116 through a serial communication circuit and utilize the IRDA standard or the Blue-Tooth standard for wireless data transfer.

The PSTN converter 146 couples to the bus 116, operates under control of applicable drivers operated by the controller 112, and provides an FXS port 82*a* for coupling to a PSTN line and/or an FXO port 82*b* for supporting operation of a traditional telephone or fax machine.

The CODEC 122 couples to the bus 116, operates under control of applicable drivers and a packet voice video application 113 operated by the controller 112. The CODEC 122 includes hardware circuits with adequate operating speed to: i) compress (and optionally encrypt) digital audio provided by the dialog system 130 and digital video provided by the camera controller 72 into sequences of RTP frames for sending to another VOIP endpoint during a media session; and ii) sequence, decompress (and optionally decrypt) RTP frames provided by the other VOIP endpoint into digital audio for presentation to the dialog system 130 and into digital video for display on the display 59.

The indicator circuit 138 couples to the bus 116 and operates under control of applicable drivers and a status application 136 operated by the controller 112. The indicator circuit 138 includes circuits for illuminating each indicator 139 in accordance with instructions provided by the status application 136.

Both the wireless module 94 and the NIC 125 couple to the bus 116 (either directly or through an interface circuit such as a PCMCIA controller), operate under control of applicable drivers operated by the controller 112, and enable the station 24 to communicate with other devices over the network 22.

The wireless module 94 provides such coupling via a wireless link to an access point 19 while the network interface circuit 125 provides such coupling by a direct connection to the backbone network 23 via an uplink port 84*a*. Exemplary wireless modules 94 may include commercially available wireless network interface cards that wirelessly communicate with an access point 19 utilizing an IEEE 802.11 protocol. Exemplary network interface circuits 125 may include commercially available network interface cards that communicate with a network hub or switch using an Ethernet protocol.

The NIC 125 may include switch circuitry 124*a* that enables the station 24 to operate as a network switch between the uplink port 84*a* and multiple down link ports 84*b*. Similarly, the wireless module 94 may include access point circuitry 124*b* which enables the wireless module 94 to operate as a wireless access point managing wireless communication within its own micro-cell and operate as a switch between uplink communications with an access point 19 (on the channel established by the access point 19) and downlink communications within the micro-cell on a channel established by and controlled by the wireless module 94.

Further, both the wireless module 94 and the NIC 125 may include applicable circuits for communicating frames with each other such that: i) uplink communication utilizes wireless module 94 while downlink communication utilizes the NIC 125; or ii) uplink communication utilizes the NIC 125 while downlink communication utilizes the wireless module 94.

The controller 112 may operate the above discussed drivers, the packet audio/video communication client 113, a system client application 115, a subscriber device application 119, the status application 136, and a multicast application 117.

The system client application 115 enables the station 24 to function as a client to web server applications. An exemplary client application 115 may be a known web browser that provides for: a) initiating a TCP/IP connection to a web server application; b) generating an image on the display 59 in accordance with a display document or display content and a style sheet received from a web server; c) output of digital audio representing an audio stream file to the dialog system 130; and d) execution of processing steps in accordance with script instructions received from a web server. Such processing steps may include providing messages or posts to the web server indicating subscriber actions (such as keyboard entry, keypad entry, or touch panel entry) and may also include providing an instruction to the communication client 113 to set up a media session in accordance with an identifier provided by the client application 115.

The multi cast module 117 may be a commercially available multicast client compatible with the IP Multicast standard and provides for the station 24 to receive invitations to multicast groups, join multicast groups, and couple received multicast media to the dialog system 130 or the display 59 for output.

Figure 4:
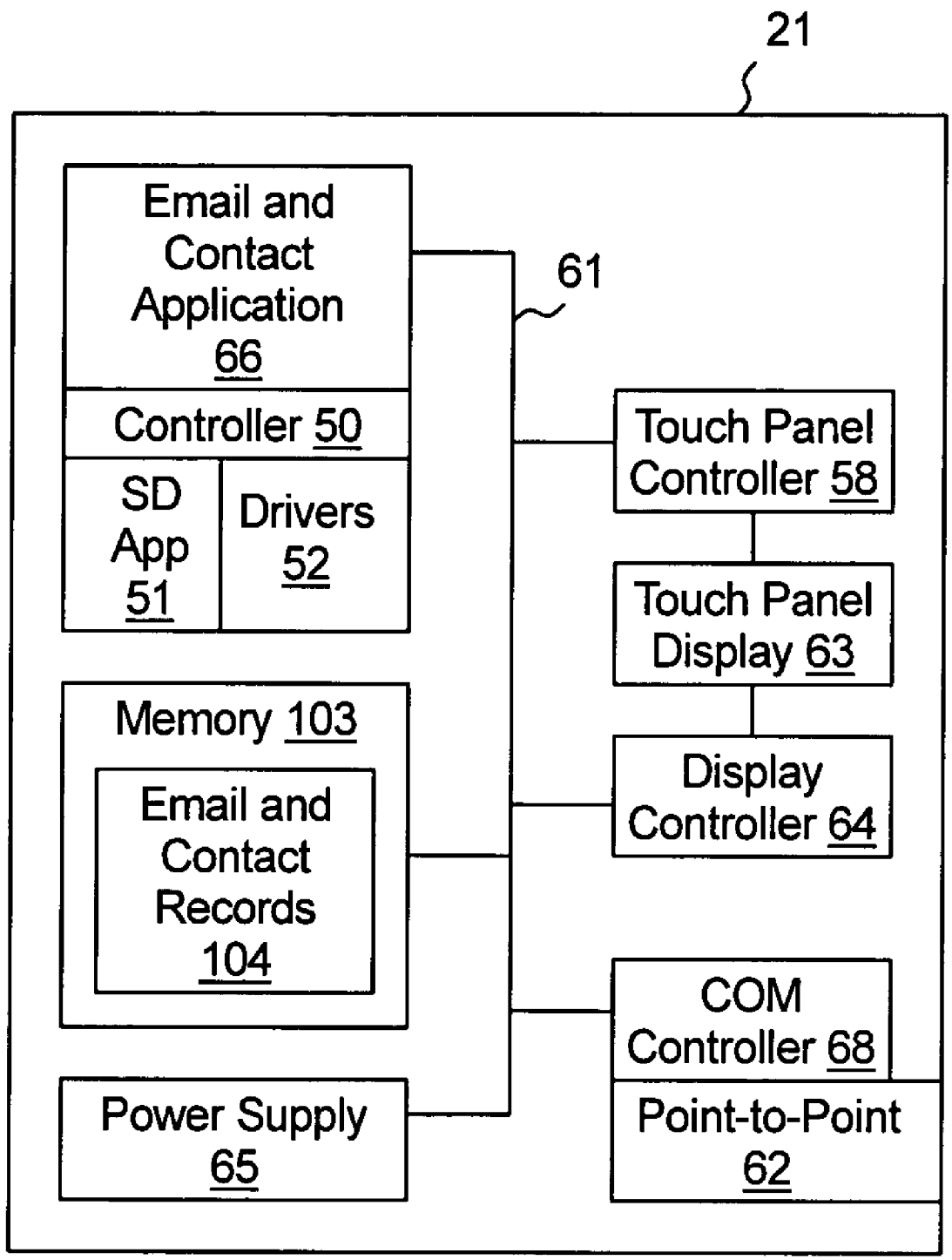
FIG. 4 is a block diagram representing an exemplary personal data device.
Figure 5:
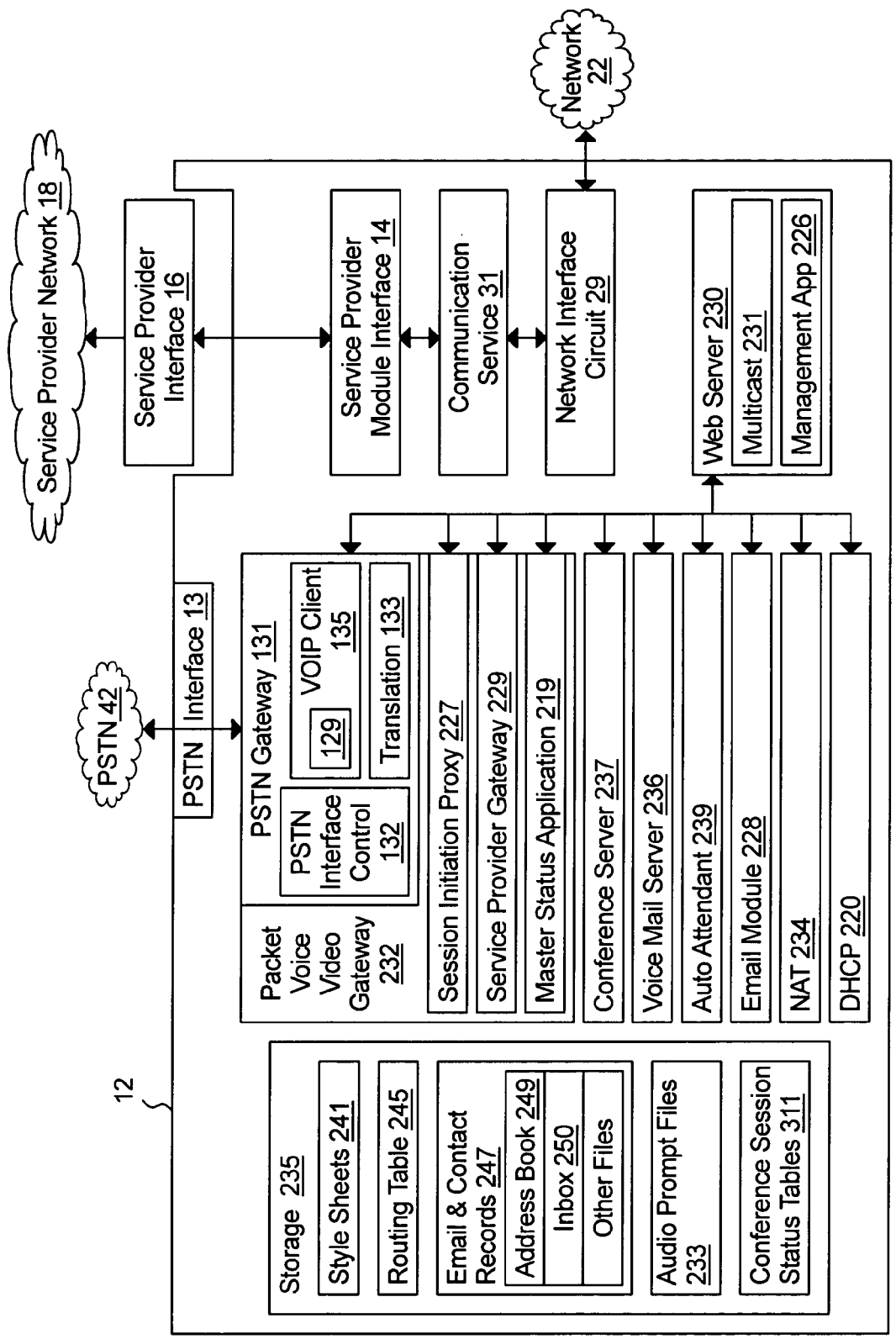
FIG. 5 is a block diagram representing an exemplary control unit.

The subscriber device application 119 provides application layer coupling to a corresponding application 51 in each PDA 21 (FIG. 4) for synchronization of email and contact records 104 in the PDA 21 with email and contact records 247 (FIG. 5).

The communication client 113 operates as a voice-over-internet-protocol VOIP compliant endpoint (VOIP endpoint) to enable the station 24 to provide real time communication services by establishing and maintaining VOIP media sessions with other VOIP endpoints. In the exemplary embodiment, the client 113 may be one of the commercially available clients utilizing established protocols such as the Internet Engineering Task Force (IETF) Session Initiation Protocols, or other protocols useful for signaling, establishing, maintaining, and tearing down VOIP media sessions utilizing UDP/IP channels over the IP compliant networks. More specifically, the client 113 may generate and respond to SIP compliant Invite, Ringing, OK, ACK, BYE, Cancel, and other SIP compliant messages known in the art.

In the exemplary embodiment, the communication client 113 may initiate a media session to a VOIP endpoint upon receiving identification of the VOIP endpoint (e.g. identification by extension number, subscriber name, or SIP URL identifier) via: i) subscriber activation of one of the selection buttons 60c (which corresponds to a predetermined identifier that is uniquely associated with the particular selection button 60c); ii) subscriber activation of the keypad 60a to input an identifier; iii) subscriber selection of an identifier from a menu on the display 59 using the touch panel 59b or menu and selection keys 60b; or iv) provision of the identifier from the system client 115.

The communication client 113 may further include DTMF tone generation module 111 and/or DTMF message module 121. The DTMF tone generation module 111 may generate a digital audio representation of a PSTN standard DTMF tone in response to operator activation of one of the keypad buttons 60a. The digital audio representation may be coupled to the dialog system for output via the speaker 100 (or the speaker in the handset 130) to provide audio feedback of button 60a activation. The digital audio representation may also be coupled to the CODEC 122 wherein it may be compressed into frames for transmission to another VOIP endpoint. Providing DTMF tones to another VOIP endpoint is useful for enabling a subscriber to place DTMF dial tones on one of the outside lines 33 and useful for enabling a subscriber to navigate through an audio prompt menu.

Because some DTMF tones may not be compressible (and subsequently reproducible) by widely used compression algorithms, the DTMF message module 121 may generate a message for transmission to another VOIP endpoint identifying a DTMF tone in response to subscriber activation of a keypad button 60a. Such message may be utilized by the other VOIP endpoint for generating the identified DTMF tone locally.

Figure 19A:
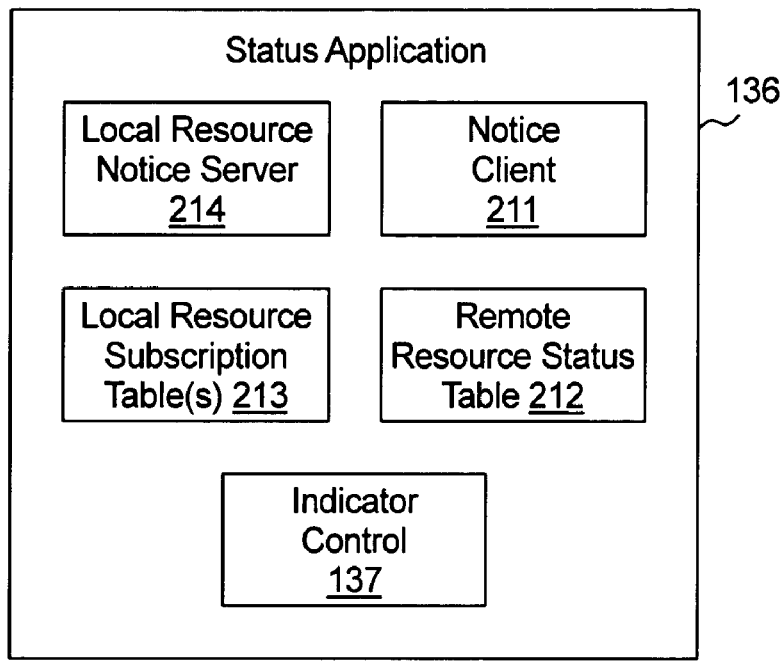
FIG. 19a represents an exemplary status application for operation on a real time communication client.

The status application 136 operates the indicators 139 to provide for each indicator to properly indicate the "on-hook" or "off-hook" status of the real time communication device 15 or outside line 33 with which it is associated. The status application 136 also provides notice of the "on-hook" or "off-hook" status of the station to the control unit 12 and/or to other remote real time communication devices 15 that subscribe to the status application 136 (the other devices 15 being subscription devices 15) to receive such status notice. Such subscription devices 15 utilize the status notice to properly control their own local indicators 139. An exemplary status application 136 is shown in FIG. 19a and described in more detail herein.

Wireless TI Phony Device

Figure 3:
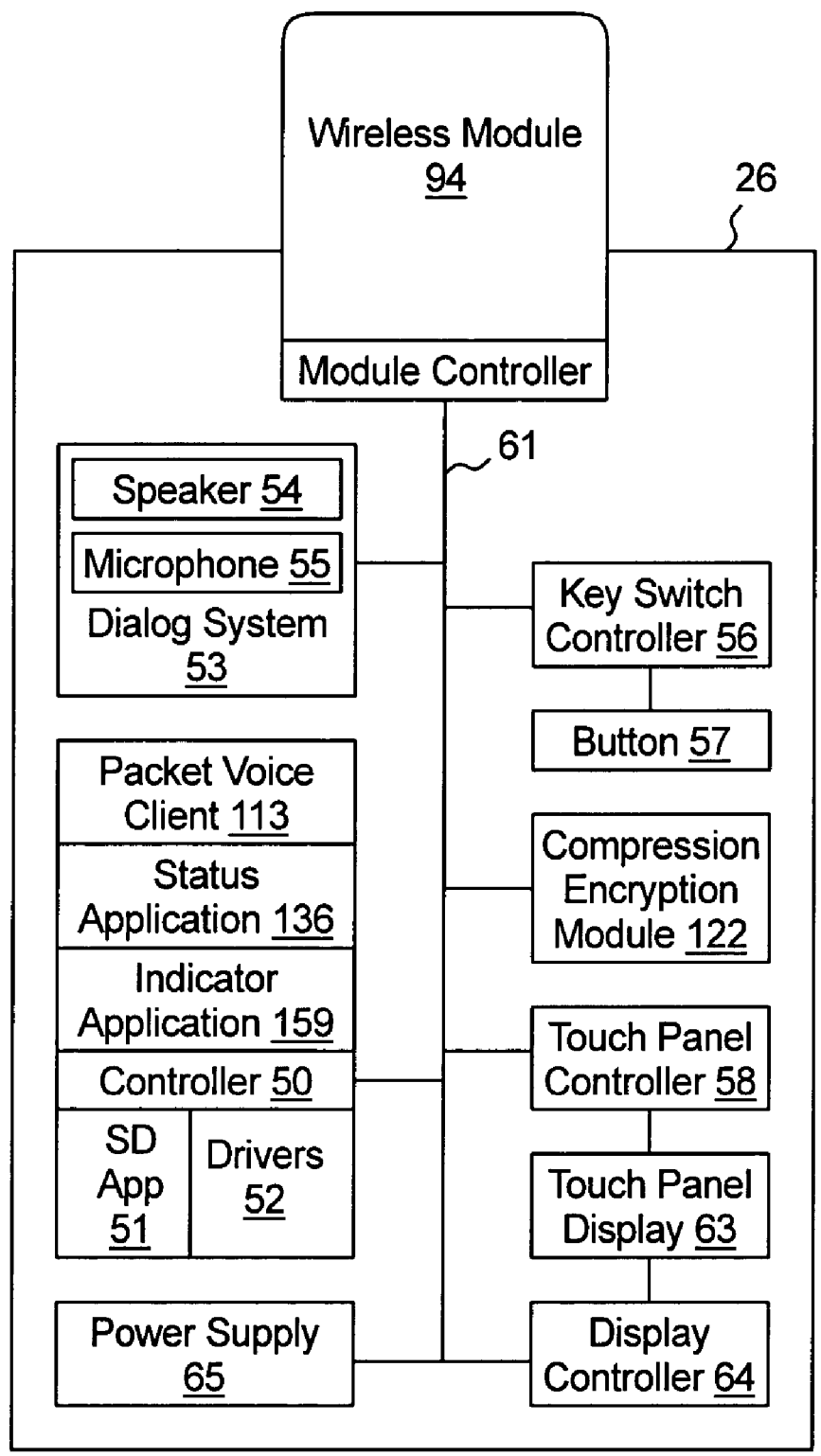
FIG. 3 is a block diagram representing an exemplary wireless telephony device.

Turning to FIG. 3 in conjunction with FIG. 1, exemplary structure of the wireless telephony device 26 is shown. The device 26 comprises a controller 50 coupled to a local bus 61 that interconnects the controller 50 with a plurality of peripheral circuits. The peripheral circuits may include a wireless module 94, a dialog system 53, a CODEC 122, a key switch controller 56, a touch panel controller 58, a display controller 64, and a power supply 65. Further, coupled to the peripheral circuits, the device 26 may comprises a speaker 54 and a microphone 55 coupled to the dialog system 53 to provide a subscriber audio interface, buttons 57 configured as a telephone keypad and coupled to the key switch controller to provide subscriber key input, and a touch panel display 63 coupled to each of the display controller 64 and the touch panel controller 58 to provide a graphic subscriber interface.

The wireless module 94 may couple to the bus 61 either directly or through an interface circuit such as a PCMCIA controller, operate under control of applicable drivers operated by the controller 50, and, as discussed with reference to the station 24, enable the device 26 to communicate with other devices over the network 22.

The CODEC 122 may couple to the bus 61, operate under control of applicable drivers and a packet voice client application 113 operated by the controller 50. As discussed with reference to the station 24, the CODEC 122 includes hardware circuits with adequate operating speed to: i) compress (and optionally encrypt) digital audio provided by the dialog system 53 into sequences of RTP frames for sending to another VOIP endpoint during a media session; and ii) sequence, decompress (and optionally decrypt) RTP frames provided by the other VOIP endpoint into digital audio for presentation to the dialog system 53.

The power supply 65 includes a battery and power supply circuitry. The power supply circuitry selectively receives input power from the battery and an external power source and converts the input power to appropriate operating power required by each component of the device 26.

The dialog system 53 couples to the bus 61, operates under control of applicable drivers operated by the controller 50, and includes applicable circuits for: i) driving the speaker 54 in accordance with digital audio received from the compression encryption module 122, and ii) detecting input form the microphone 55 and generating digital audio for presentation to the compression encryption module 122.

The display controller 64 and the touch panel controller 58 each couple to the bus 61, operate under control of applicable drivers operated by the controller 50, and together enable the touch panel display 63 to provide information to the subscriber and receive subscriber input. In the exemplary embodiment, the display controller 64 and the touch panel controllers 58 are each compatible with the display resolution and the touch panel resolution of the touch panel display 63, The key switch controller 56 couples to the bus 61, operates under control of applicable drivers operated by the controller 50, and enables the controller 50 to receive subscriber input through the buttons 57.

The packet voice communication client 113 is operated by the controller 50 and, as discussed with reference to the station 24, operates to establish and maintain VOIP media sessions with other VOIP endpoints over the network 22.

The controller 50 may further operate the status application 136 (as shown in FIG. 19a) and may operate an indicator application 159. The indicator application 159 provides for virtual indicators 139 and virtual selection buttons 60c (as discussed with respect to the station 24) on the touch panel display 63. Virtual indicators and selection buttons may be utilized due to size constraints and power consumption constraints with indicators and selection buttons on a device the size of the wireless telephony device 26.

PDA

Referring to FIG. 4, exemplary structure of the PDA 21 is shown. The PDA 21 may include all of the same structures as the wireless telephony device 26 discussed with reference to FIG. 3, but may not include the packet voice communication client 113, the wireless module 94, the key switch controller 56, the buttons 57, or the dialog system 53, speaker 54, and microphone 55.

In addition to the elements discussed with reference to the telephony device 26, the PDA 21 include a wireless point-to-point communication module 62, a subscriber device application 51, an email and contact application 66, and email and contact records 104 stored in a memory 103.

The wireless point-to-point communication module 62 couples to the bus 61 (either directly or through an interface circuit such as a serial communication controller), operates under control of applicable drivers operated by the controller 50, and enables communication with a corresponding module 62 in a station 24.

The subscriber device application 51 is operated by the controller 50 and is similar to, and compatible with, the subscriber device application 119 of the station 24. The application 51 provides for synchronization (through the station 24) of email and contact records 104 with email and contact records 247 in the control unit 12.

The email and contact application 66 is operated by the controller 50 and provides for displaying information from the email and contact records 104 on the touch panel display 63 and for enabling subscriber manipulation of such records via the touch panel display 63 or the buttons 57. The email and contact application 66 may be any commercially available email and contact client that is configured for operation on a small size display screen.

Control Unit

Referring to FIG. 5 in conjunction with FIG. 1 an exemplary control unit 12 is shown. The control unit 12 includes a service provider module interface 14 for coupling to the service provider interface 16, the PSTN interface 13, the local area network circuit 29, a packet audio/video gateway 232 (comprising a PSTN gateway 131, a session initiation proxy server 227, a service provider gateway 229, and a master status application 219), a conference server 237, a voice mail server 236, an auto attendant module 239, an email module 228, a network address translation server 334, an address server 220, a web server 230, storage 235, and communication services 31.

Some illustrative examples of a service provider interface 16 include: i) cable modem module 16a for communicating over coaxial cable 36 with a coaxial cable based service provider network 18, ii) wireless radio module 16b for communicating over a wireless communication channel 38 with a service provider access point of a satellite or terrestrial wireless based service provider network 18; iii) a customer service unit (CSU) 16c for communication over a T1 line 40 with a digital PSTN based service provider network 18; and a fiber optic 16d for communication over a fiber optic based service provider network 18.

The PSTN interface 13 couples to the one or more telephone lines 33 from the central office of the PSTN 42 and couples to the PSTN gateway 131. The PSTN interface 13 comprises applicable circuits for interfacing with the telephone lines 33 under control of the PSTN gateway 131 including, but not limited to, circuits for: i) taking each telephone line 33 off hook to initiate a PSTN telephone call or to respond to PSTN ringing provided by the central office; ii) detecting dial tone on the telephone line 33 and providing a digital representation of the dial tone to the PSTN gateway 131; iii) modulating DTMF tones onto the telephone line 33 in accordance with a digital audio representation of the tones (or other applicable instructions) provided by the PSTN gateway 131; iv) modulating audio (analog or PSTN digital audio) onto the telephone line 33 in accordance with a digital representation of audio provided by the PSTN gateway 132; and v) detecting modulated audio (analog or PSTN digital audio) on the telephone line and providing a digital representation thereof to the PSTN gateway 131.

Each of the PSTN gateway 131, the session initiation proxy server 227, the service provider gateway 229, the master status application 219, the conference server 237, the voice mail server 236, the auto attendant module 239, the email module 228, the network address translation server 234, the address server 220, and the web server 230 exchange information with each other and with remote applications operating on remote devices coupled to the network 22 or the service provider network 18 utilizing TCP/IP connections and UDP/IP channels. As such, communication services 31 comprise applicable IP stacks and port management systems for enabling such communication between components and provides for interfacing between the components and each of a network interface circuit 29 and the service provider module interface 14 for setting up TCP/IP connections and UDP/IP channels over the network 22 and the service provider network 18 respectively.

The address server 220 and the translation server 234 enable the control unit 12 to operate the network 22 as an IP subnet. The address server may be a known DHCP server that operates to assign IP addresses to the network devices 20. The translation server 234 may be a known IP layer proxy (e.g. NAT Server) enabling the various devices 20 to establish TCP/IP connections and UDP/IP channels to devices coupled to the service provider network 18.

A media session between two VOIP endpoints may be a VOIP session directly between the two VOIP endpoints. A media session between a VOIP endpoint and a circuit switched device coupled to the PSTN 42 may comprise a VOIP session between the VOIP endpoint and the PSTN gateway 131 plus a PSTN session between the PSTN interface 13 and the circuit switched device.

As such, the PSTN gateway 131 comprises: i) PSTN interface control circuits 132 which enable the PSTN gateway 131 to control the PSTN interface 13 to operate as a PSTN endpoint to a PSTN session with a remote circuit switched device over the PSTN 42, ii) a VOIP client circuit 135 that enables the PSTN gateway 131 to operate as a VOIP endpoint to a VOIP session with a corresponding VOIP client (either another device on network 22, the conference server 237, the voice mail server 236, or the auto attendant 239), and iii) a translation circuit 133 (including a CODEC 122 and DTMF tone module 129) that translates audio between the PSTN session and the VOIP session.

The service provider gateway 229 operates as an IP layer proxy for translating frames between a VOIP endpoint on the network 22 and a VOIP endpoint on the service provider network 18 or the Internet 30.

The session initiation proxy server 227 facilitates set up of a VOIP session between two VOIP endpoints by routing session signaling messages there between. The session initiation proxy server 227 receives a session signaling message, refers to a routing table 245 for determining a routing address for the message based on an identifier within the message, translates the destination address within the message to the routing address, and forwards the message to the routing address.

Figure 7:
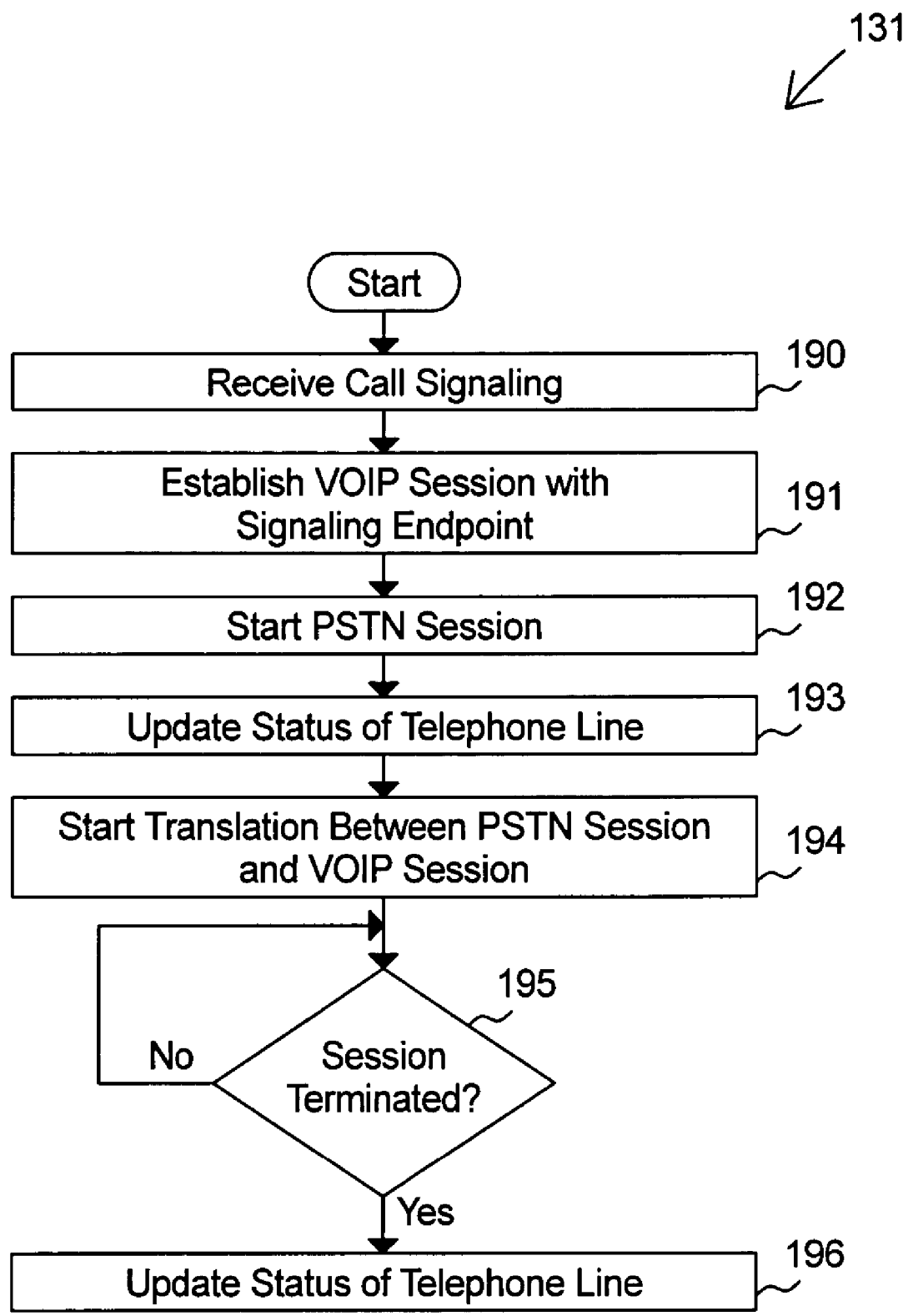
FIG. 7 is a flow chart representing one aspect of exemplary operation of a a PSTN gateway.

Turning briefly to FIG. 7, a flow chart representing exemplary operation of one aspect of the PSTN gateway 131 to couple a VOIP session to a PSTN session is shown.

Step 190 represents receiving call signaling over the network 22 from a real time communication device 15 (e.g a signaling endpoint) that is signaling the PSTN gateway 131 on the PSTN Gateway 131 IP address and on a port number associated with one of the outside lines 33. Step 191 represents providing for the VOIP client 135 to establish logical channels to support a real time communication session with the signaling endpoint. Step 192 represents starting a PSTN session by providing for the PSTN interface 13 to take the outside line 33 that is associated with the port on which the session signaling was received "off hook".

Step 193 represents updating the status of the outside line 33 by providing for the local resource notice sever 214 in the master status application 219 (discussed herein) to provide notice messages of the outside line 33 state change to subscription devices that have unexpired subscriptions (e.g. the change in state occurs prior to expiration of the subscription) as will be discussed in more detail herein.

Step 194 represents starting translation between the PSTN session and the VOIP session which may include detecting and receiving a dial tone on the on the outside line 33 (as generated by the central office) and providing a digital representation thereof on the VOIP session (e.g. provides a digital representation of the dial tone to the CODEC 122 for compression into frames for transmission to the VOIP endpoint over the VOIP session). Translation may also include detecting dual tone multi frequency (DTMF) signals within the compressed audio data of the VOIP session (or detecting messages representing DTMF signals from the endpoint) and providing for the DTMF tone module 129 to generate a digital audio representation of the DTMF tones for coupling to the PSTN interface 13 which in turn generates PSTN DTMF signals on the outside line 33 for dialing on the outside line 33 or menu navigation.

Step 195 represents determining whether the PSTN session is terminated by the central office (e.g. other PSTN endpoint hangs up) or whether it is terminated by the PSTN gateway 131 in response to termination of the VOIP session. When terminated, step 196 represents updating the status of the outside line 33 by providing for the local resource notice sever 214 in the master status application 219 (discussed herein) to provide notice of the outside line state change to subscription devices.

Turning to FIG. 6, an exemplary routing table 245 is shown. The routing table 245 associates a routing address 254 to each identifier 246 which represents a VOIP endpoint (e.g. real time communication device 15) or an outside line 33 of the system 10.

More specifically, the routing table 245 comprises a record 251 for each identifier 246 that may be used to identify a real time communication device 15 or an outside line. The identifier 246 may be a number such as a traditional extension number, a name, SIP URL, or other identifier of a person or line (collectively, a name). If a name and number correspond to the same destination, a single record 251 may be used.

Associated with each identifier 246 is: i) a routing address 254; and ii) optionally a reference identifier 248. The routing address 254 comprises an IP address 254*a* and a port number 254 by that may be utilized by the session initiation proxy 227 to provide session signaling to the endpoint in response to receiving session signaling with the identifier. The reference identifier 248 is the identifier to which the initiating endpoint is referred if the endpoint associated with the routing address 254 does not respond to the session signaling.

Figure 8:
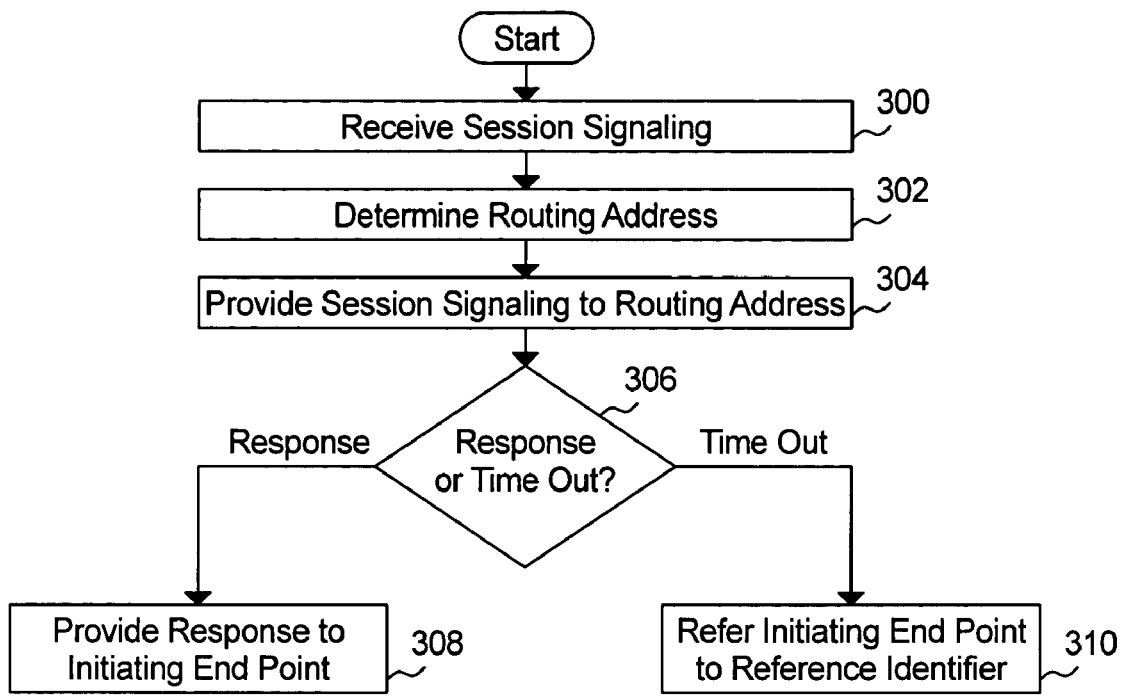
FIG. 8 is a flow chart representing exemplary operation of a session initiation proxy server.

Referring to the flowchart of FIG. 8 in conjunction with FIG. 6, exemplary operation of the session initiation proxy server 227 is shown. Step 300 represents receiving session signaling, such as a SIP Invite message, from an initiating VOIP endpoint that includes an identifier.

Step 302 represents determining the routing address 254 associated with the identifier using the routing table 245 and step 304 represents translating the destination address of the session signaling message to provide session signaling to the destination VOIP endpoint routing address 254.

Step 306 represents determining whether there is a response to the session signaling prior to elapse of a timeout duration. In the exemplary embodiment, a SIP 200 OK message may be considered a response, however, SIP ringing messages may not considered a response.

If the destination endpoint at the routing address responds, step 308 represents translating the destination address in the response message to provide a response to the initiating endpoint such that further session set up messages may be transferred between the initiating endpoint and the destination endpoint.

If the destination endpoint does not respond within the time out period, step 310 represents canceling the session signaling and providing the reference identifier 248 to the initiating endpoint such that the initiating endpoint may provide a session signaling message to the reference identifier.

After a VOIP session is established, communication of audio (and video) data between the two endpoints comprises compressing digital audio data into a sequence of RTP frames, optionally encrypting the RTP frames, and sending the RTP frames to the other endpoint utilizing UDP/IP datagrams on the negotiated channels. At the other endpoint, the UDP/IP datagrams are received, sequenced, and the RTP frames are recovered, decrypted if applicable, and decompressed to yield the digital audio data.

Returning to FIG. 5, to support a VOIP session between a VOIP endpoint on network 22 and a VOIP endpoint on the service provider network 18 or the Internet 30, the translation module 229 includes circuitry for operating as an IP layer proxy for relaying UDP/IP datagrams between the two endpoints.

Status Applications

The status application 136 in each real time communication device 15 and the master status application 219 in the control unit 12 operate by exchanging subscribe messages and notify messages with each other to obtain "on-hook" status (e.g. not participating in a media session) and "off-hook" status (e.g. participating in a media session) change information related to the devices 15 and outside lines associated with the indicators 139.

FIG. 19*a* represents a block diagram of the status application 136. The status application 136 comprises a local resource notice server 214, local resource subscription table(s) 213, a notice client 211, a remote resource status table 212, and indicator control 137.

Figure 19B:
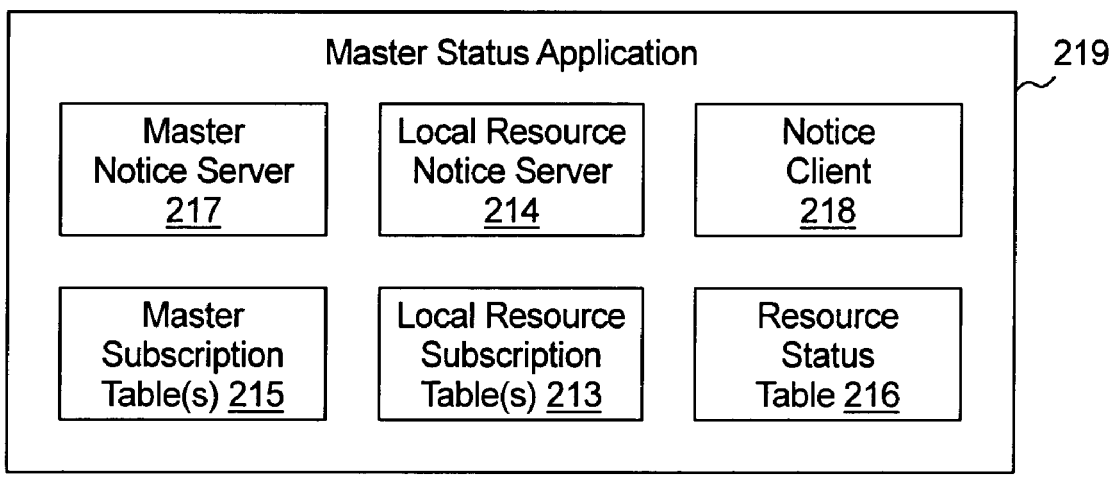
FIG. 19b represents an exemplary status application for operation on a control unit.

FIG. 19*b* represents a block diagram of the master status application 219. The master status application 219 comprises a master notice server 217, master notice server subscription tables 215, a local resources notice server 214, local resource subscription tables(s) 213, a notice client 218, and remote resource status tables 216.

In a first embodiment, the master status application 219 in the control unit 12 will subscribe to the local resource notice server 214 in each real time communication device 15 to obtain the "on-hook" and "off-hook" status of each such device 15, maintain the remote resource status table 216 that includes data representing the status of each device 15 and each outside line. And, each notice client 211 in each subscription device 15 will subscribe to the master notice server 217 to obtain the status of the other devices 15 and the outside lines that are associated with the indicators 139 on the device 15.

In a second embodiment, the master status application 219 will include only the local resource notice server 214 and the local resource subscription table 213. Each notice client 211 in each subscription device 15 will subscribe to the local resource notice server 214 in each other real time communication device 15 to obtain such devices status and will subscribe to the local resource notice server 214 in the control unit 12 to obtain the status of the outside lines.

In both such embodiments, the subscribe and notify messages may include a subscription message 140, a subscription acknowledge message 141, and a notice message 142 as shown in FIGS. 24a, 24b, and 24c respectively.

Turning briefly to FIG. 24a, an exemplary subscription message 140 may include a routing header 143 that includes identification of the notice server to which the subscription message is sent, a notice client ID 133, and a resource ID 145.

Identification of the notice server may be the IP address and port number 143a of the master notice server 217 or the local resource notice server 214. Alternatively, identification of the notice server may be an identifier 143b of the master notice server 217 or the local resource notice server 214 such that a proxy server may map the identifier to the IP address and port number of such the notice server, translate the routing header, and provide the translated message to the notice server.

The notice client ID 133 may be the IP address and port number 144a of the notice client 218 or the notice client 211 or may be an identifier 144b of the notice client 218 or notice client 211 such that a proxy server may map the identifier to the IP address and port number of the notice client.

The resource ID 145 includes the identifier of the extension(s), subscriber(s), or outside line(s) for which the notice client 218 or notice client 211 desires to obtain notice of change between "on-hook" and "off-hook" status.

Turning briefly to FIG. 24b, an exemplary subscription acknowledgement message 141 may include the notice client ID 144 provided in the subscription message 140, a confirmation of the resource ID 145 provided in the subscription message 140, and an expiration time for the subscription 148.

Turning briefly to FIG. 23b, an exemplary notice message 142 may include the notice client ID 144, the resource ID 145, and the status of the resource 149.

Referring briefly to FIG. 23 in conjunction with FIG. 19b, the resource status table 216 includes a record 145 for each resource in the system 10 (each extension and each outside line). The resource is identified by the unique resource identifier 145 and associated with the resource identifier 145 is the notice server ID 143 associated with the resource, the subscription expiration 148, and an indicator of the resource status 177.

Figure 20:
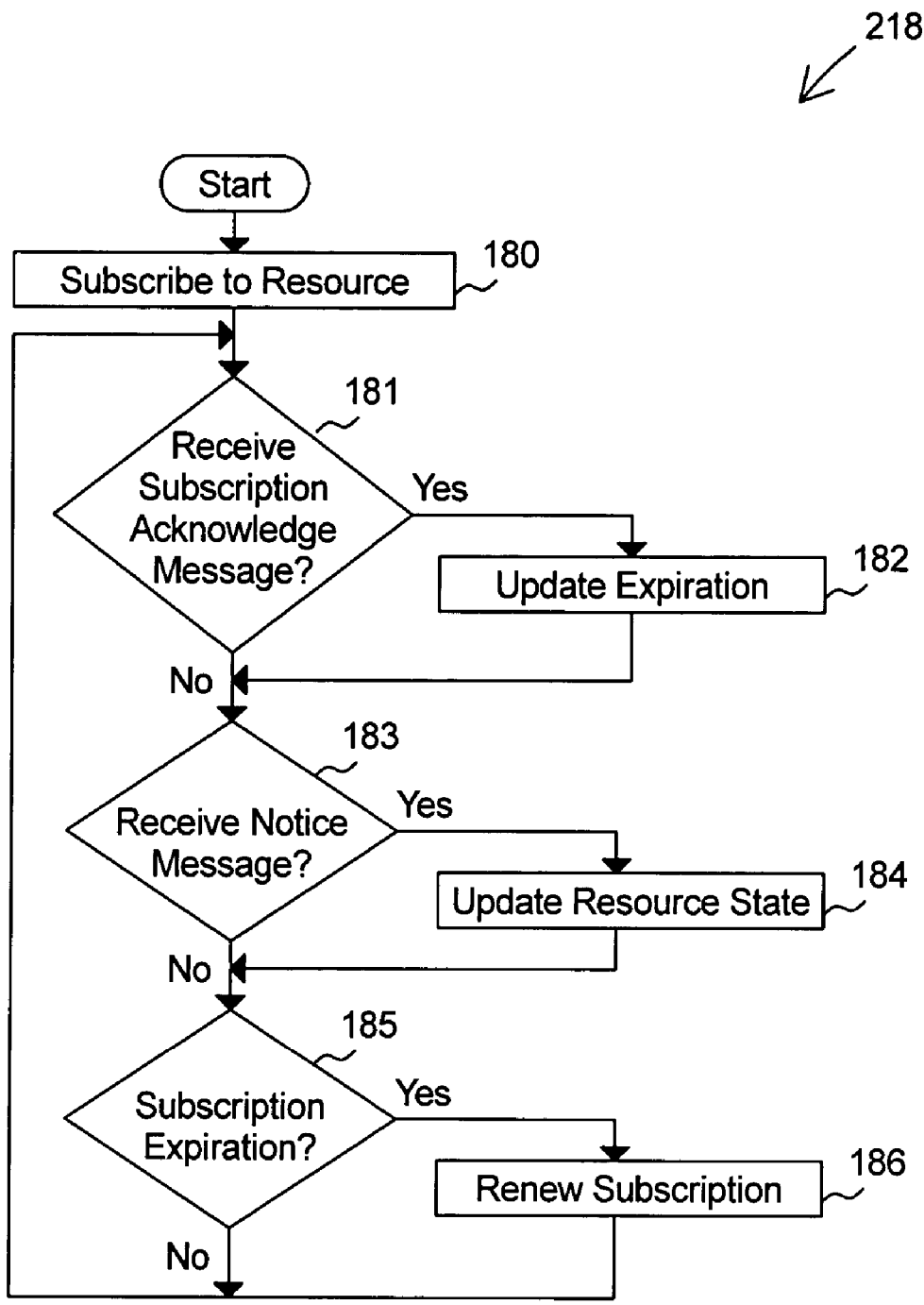
FIG. 20 is a flow chart representing exemplary operation of a notice client.

The resource table 216 is maintained by the notice client 218. Turning briefly to FIG. 20, exemplary operation of a notice client 218 is shown. Step 180 represents the notice client 218 subscribing to a resource ID 145 that is included in a record of the resource status table 216 by sending a subscription message 140 to the notice server ID 145. This step 180 may be performed for each resource ID 145 in the table 216.

Steps 181, 183, and 185 represent the notice client 218 determining whether a subscription acknowledge message 141 has been received at step 181, whether a notice message 142 has been received at step 183 or whether a subscription has expired (or is about to expire) at step 185. In response to receiving a subscription acknowledge message 141, the client 218 will update the subscription expiration 184 in the table 216 at step 182. In response to receipt of a notice message 142, the client 218 will update the resource status 177 in the table 216 in accordance with the status 149 in the message 142 at step 184. In response to determining that a subscription has expired (or is about to expire) at step 185, the client 218 will provide a new subscription message 140 to the notice server ID 143 to renew the subscription at step 186.

To provide status of each resource in system 10 to each subscription device 15, the master status application 219 includes the notice server 217 and the master notice server subscription tables 215.

Figure 21:
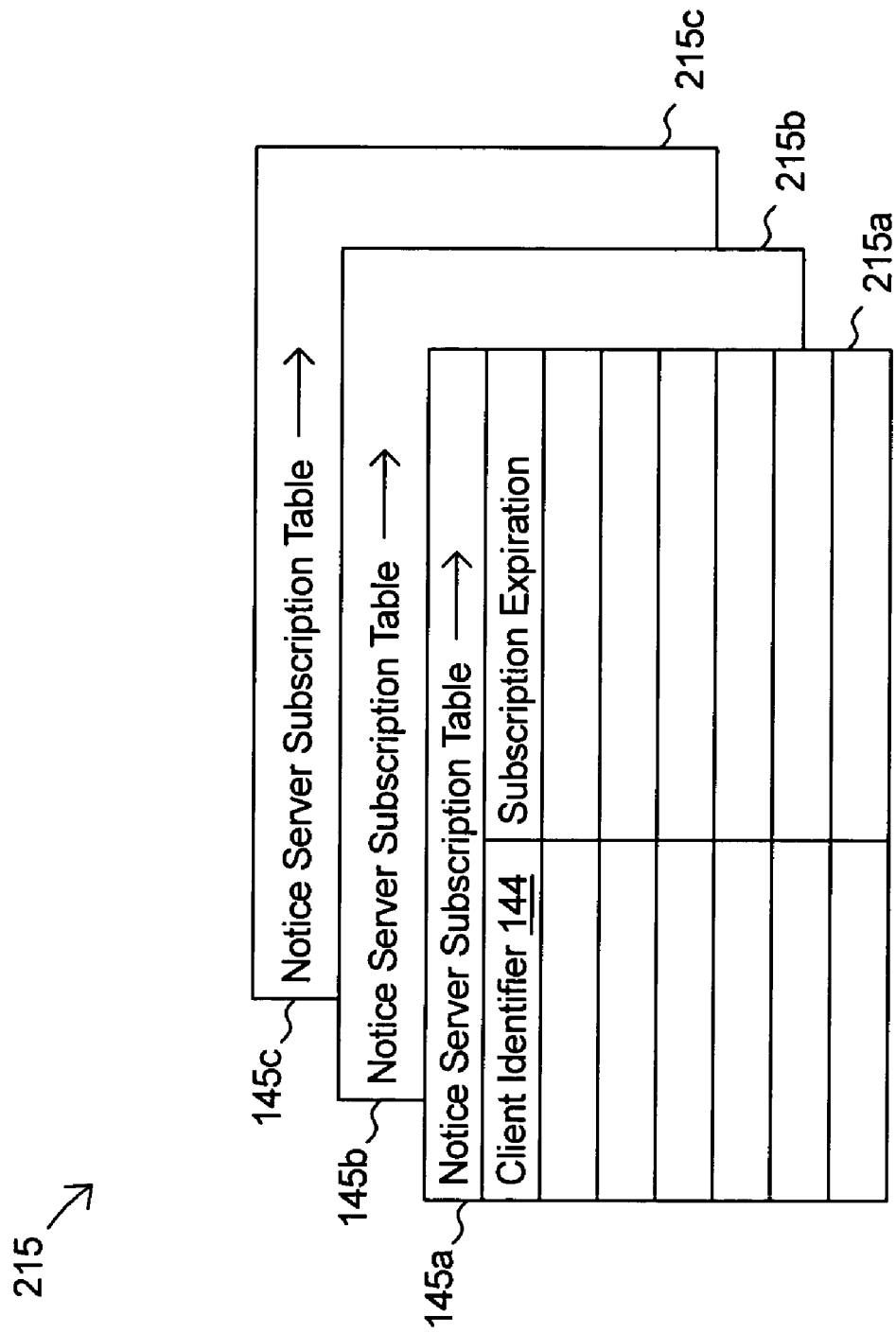
FIG. 21 represents an exemplary notice server subscription table.

Turning briefly to FIG. 21, the master notice server subscription tables 215 include a plurality of notice server subscription tables 215a, 215b, and 215c, each table being uniquely associated with one resource ID 145 from the resource status table 216.

Each subscription table includes a plurality of records, one for the notice client ID 144 of each notice client 211 that subscribes to the resource ID 145 by sending a subscription message 140 to the master notice server 217. Associated with the notice client 211 is the subscription expiration 148 provided back to the notice client 211 in the subscription acknowledge message 141.

Figure 22:
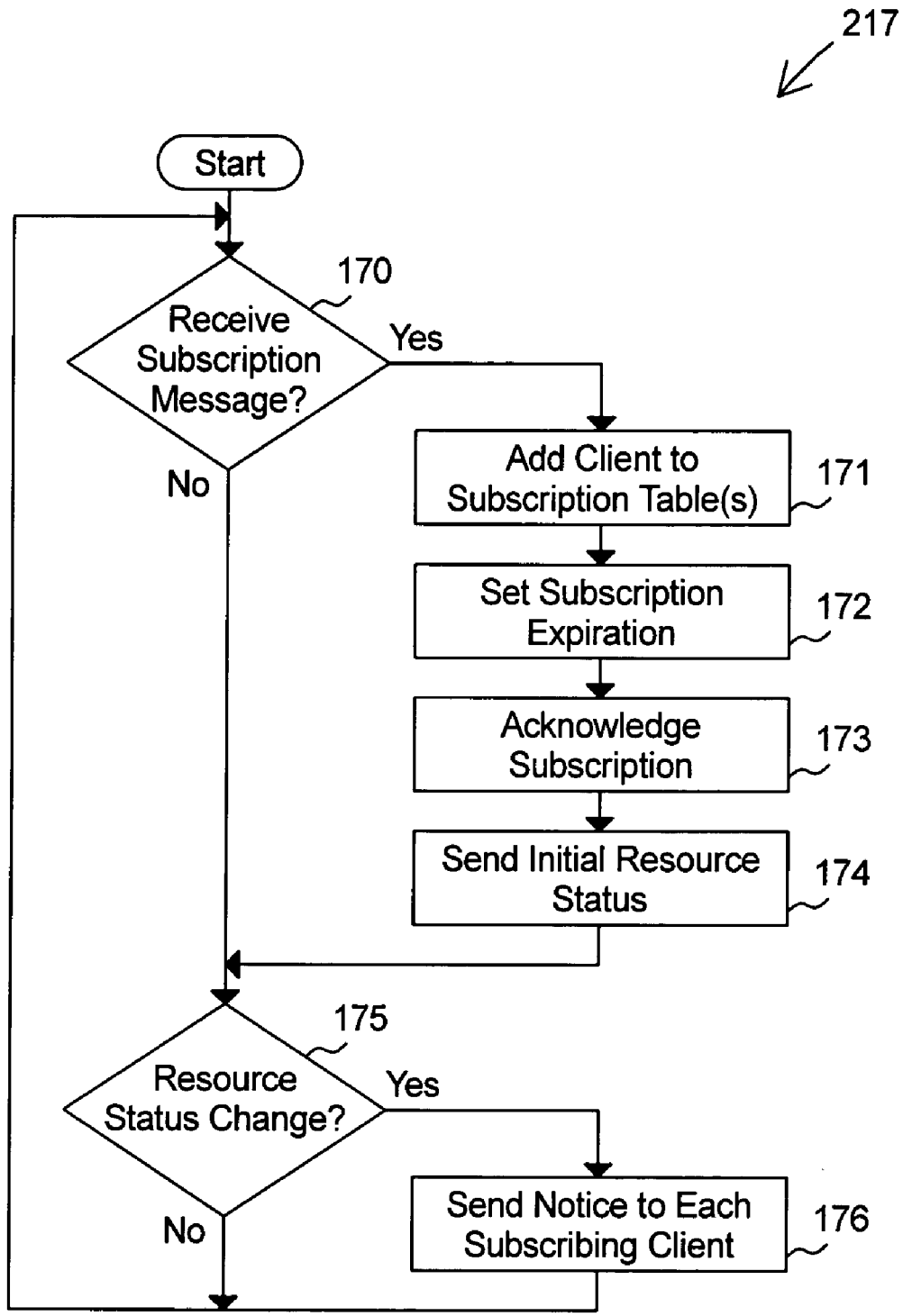
FIG. 22 is a flow chart representing exemplary operation of a notice server.

The master notice server subscription tables 215 are maintained by the master notice server 217. Referring to FIG. 22, exemplary operation of the master notice server 217 is shown. The master notice server 217 operates in response to receiving a subscriptions message 140 from a notice client and in response to change in the status 177 of a resource in the resource status table 212.

Step 170 represents receiving a subscription message 140 from a notice client 211. In response to receiving a subscription message 140, the notice server 217 may add the client ID 144 to the applicable subscription tables 145a, 145b, and 145c in accordance with the one or more resource IDs 145 in the subscription message 140 at step 171. At step 172, a subscription expiration time is set and written to the applicable subscription tables 145a, 145b, and 145c. At step 173, a subscription acknowledge message 141 is sent to the notice client 211. At step 174, an initial notice message 142 is sent to the notice client 211 indicating the current resource status 177 the from the resource status table 212.

Step 175 represents detecting a change in status 177 or a resource in the resource status table 212. In response to a change in status 177, a notice message 142 is sent to each notice client 211 that subscribed to the resource that underwent the status change as determined from the applicable notice subscription table 145a, 145b, or 145c.

Returning to FIG. 19b, the local resource notice server 214 and the local resource subscription table 213 operate as will be discussed with reference to the status application 136. The local resource notice server 214 and the local resource subscription table 213 are included in the master status application 219 for providing status of the outside lines. More specifically, the notice client 218 subscribes to the local resource notice server 214 to obtain outside line status and the master notice server 217 provides outside line status to subscription clients 215 from the resource status table 216.

Referring to FIG. 19a, the status application 136 includes a local resource notice server 214, a local resource subscription table 213, a notice client 211, a remote resource status table 212, and an indicator control application 137.

The local resource notice server 214 and the resource subscription table 213 operate in a similar manner to the master notice server 217 and the master subscription table 215 except that typically only the master notice client 218 will subscribe and there may be only a single resource table 145 for the local resource (e.g. the extension number of the real time communication device 15 or the outside line).

The notice client 211 and the resource status table 212 will be similar to the notice client 218 and the resource status table 216, except that the resource status table 212 will only include resource ID 145 for those resources that correspond to one of the indicators 139 on the real time communication device 15.

The indicator control 137 will provide for illumination of applicable indicators 139 in accordance with the status 177 of each resource in the resource status table 212 (e.g the indicator may be "on" when the status 177 indicates that the resource is "off-hook:" and the indicator may be "off" when the resource is "on-hook").

In the second embodiment, the master status application 219 may only includes the local resource notice server 214 and the local recourse subscription table 213. The notice client 211 of each subscription device 15 would subscribe to the local resource notice server 214 in the control unit 12 to obtain status of the outside lines.

The local resource notice server 214 in each real time communication device 15 would operate as described above, but would support subscriptions from multiple notice clients 211 in other subscription devices 15. And, the notice client 211 would subscribe to multiple local resource notice servers (one in each real time communication device 15) to obtain resource status of such devices local resources.

Conference Server

A conference session comprises a real time communication session amongst participants such that each participant receives audio representing the other participants. And, each participant with video display capabilities may receive video from other participants that have video capture capability.

Figure 9:
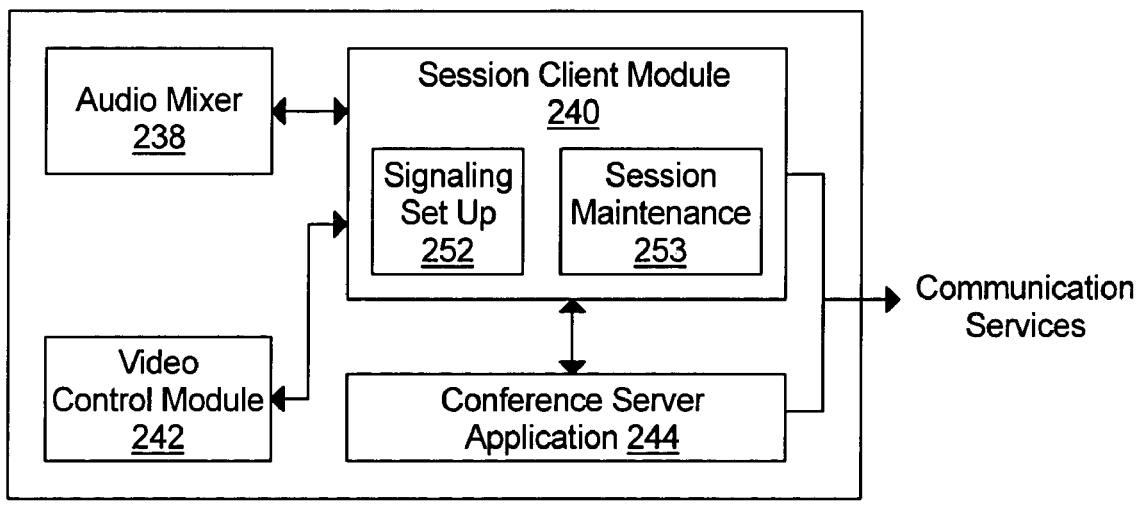
FIG. 9 is a block diagram representing an exemplary conference server.

Referring to FIG. 9, to provide such conference session capabilities, the conference server 237 comprises a session client module 240, an audio mixer 238, a video control module 242, and a conference server application 244.

The session client module 240 operates as an endpoint to a VOIP session with each conference session participant. More specifically, the session client module establishes a session with each conference participant in accordance with an identification corresponding to each participant as provided by the conference server application 244 and then maintains each VOIP session for the duration of the conference session.

The audio mixer 238 receives an audio stream from the session client module 240 for each conference participant and generates one or more conference mix signals. The conference mix signals are provided to the session client module for transmission to the conference participants.

The video control module 242 receives a video stream from the session client module 240 for each conference participant that provides motion video, generates a motion video stream for each participant in accordance with the participant's video selection (as received from the conference server application 244) and provides each such video stream to the session client module 240 for transmission to the applicable conference participant.

The conference server application 244 controls operation of the audio mixer 238, the session client module 240, and the video control module 242. The conference server application 244 also operates as a web server to provide a user interface to session participants that enable session participants to set up and control a conference session.

Figure 10:
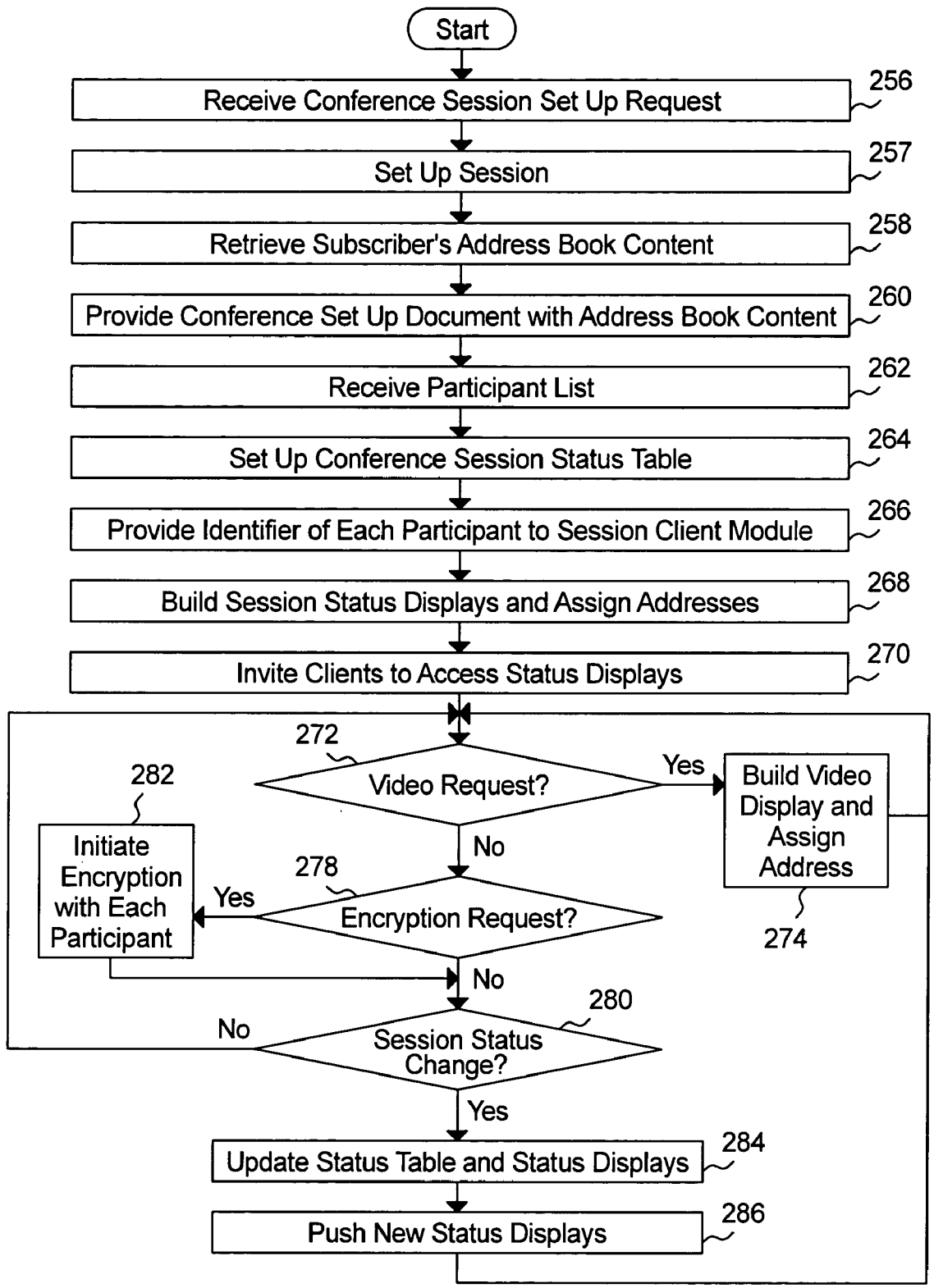
FIG. 10 is a flow chart representing exemplary operation of a conference server application.

FIG. 10 shows a flowchart that represents exemplary operation of the conference server application 244. Step 256 represents receiving a conference set up request from a subscriber at an initiating subscriber station 24 or a subscriber device 26 (initiating real time communication device 15 of FIG. 1). In the exemplary embodiment, the conference set up request may take the form of the initiating station sending a frame to the conference server application 244, on a predetermined IP address and port number, to establish a TCP/IP connection with the conference server application 244. Step 257 represents establishing the session with the initiating real time communication device 15.

Step 258 represents retrieving the address book content 249 of the subscriber associated with the initiating real time communication device 15 from the email and contact records 247 in storage 235. Step 260 represents providing a conference initiation document that includes the address book content 249 to the initiating real time communication device 15 in document format. The document format may be an HTML document, an XML document (e.g. content messages and display layout control messages) or other document format displayable on the initiating real time communication device 15.

Figures 11A, 11B:
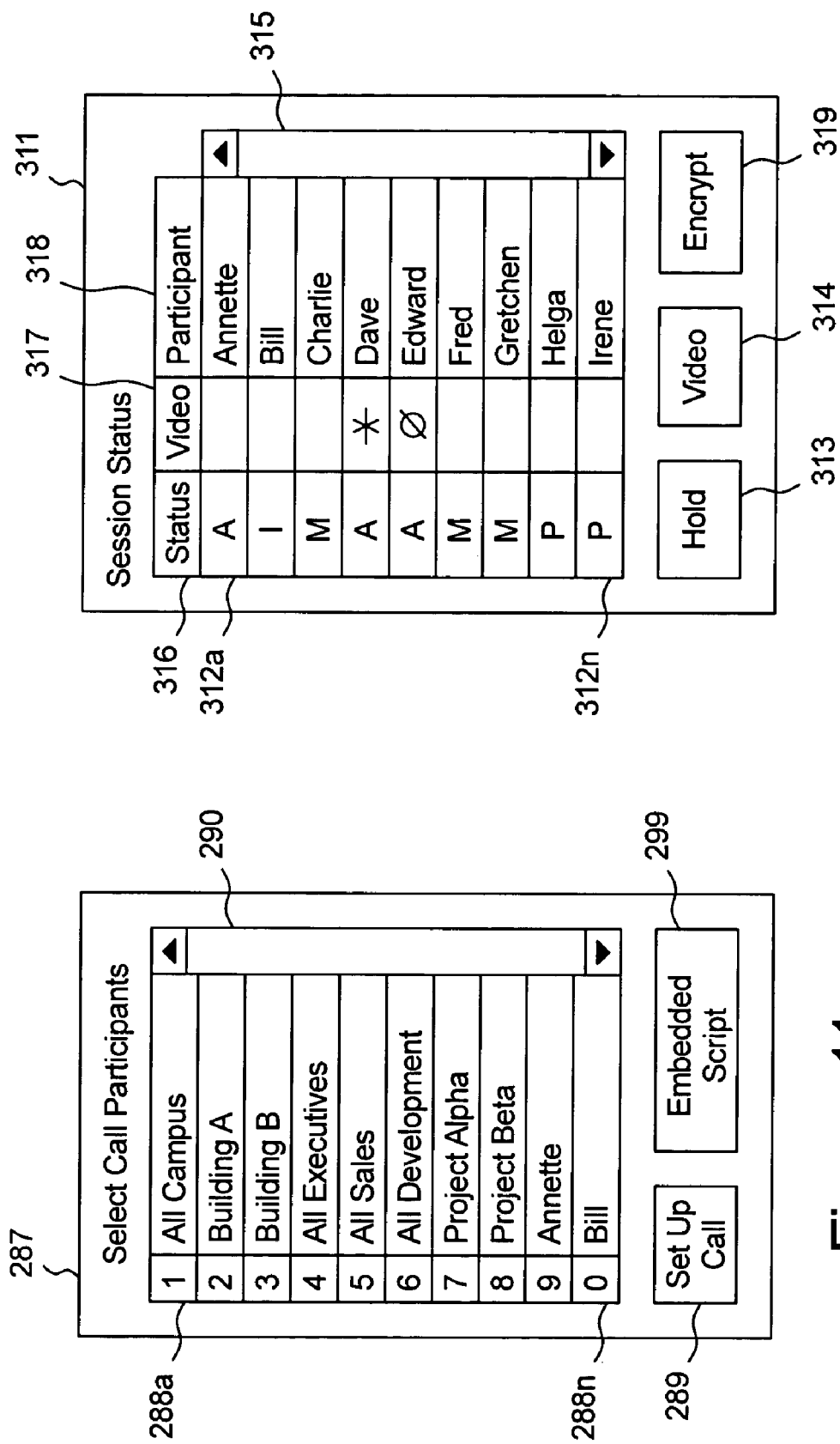
FIG. 11a represents an exemplary conference initiation document.
FIG. 11b represents an exemplary session status document.

Turning briefly to FIG. 11a, an exemplary conference initiation document 287 is shown. The document 287 includes a record 288 for each contact (or contact group) from the subscriber's address book content and a set up call control 289. A scroll control 290 enables display of additional records 288 that may not fit entirely on the display of the initiating real time communication device 15. The document 287 also includes applicable script to enable the subscriber to highlight multiple records 288 to select multiple conference session participants using the touch panel 59b or the navigation and selection buttons 60b. And, applicable script such that when the subscriber activates the set up call control 289, the selected records 288 are identified to the conference server application 244 over the TCP/IP connection.

Returning to FIG. 10, step 262 represents receiving the participant list and step 264 represents setting up a session status table for the conference session. Turning to FIG. 13, an exemplary session status table 291 is shown. The session status table 291 includes a record 292 for each conference session participant. Associated with each participant is the participant's name 293 and identifier 294 for setting up a media session to the participant, both from the email and contact records 247. Further associated with each participant is an indication of each of the participant's security status 295, the participant's audio status 296, the participant's video status 297, and the participant's video display mix selection 298, each of which is discussed in more detail herein.

Step 266 represents providing the identifier 294 for each participant from the session status table 291 to the session client module such that the session client module may initiate a media session to each participant.

Step 268 represents building a session status document for each participant. Turning to FIG. 11b, an exemplary session status document 311 is shown. The session status document 311 includes a record 312 for each participant and associated with each participant is an indication of the participant's status. The participants status may be: "A" indicating that the participant is active in the session sending and receiving audio; "I" indicating that the participant is inactive (e.g. no session established with the participant); "M" indicating that the participant is active, receiving an audio stream, but is muted and not sending an audio stream; and "P" indicating that the participant is in a separate and private break-out conference session with one or more other participants.

Step 270 represents inviting each participate to access its status document 311. More specifically, the conference server application 244 may make each participant's status document 311 available on a predetermined port number and may provide a frame to each participant inviting that participant to establish a TCP/IP connection at the particular port number where such participant's status document 311 is available Steps 272, 278, and 280 together represent the conference server application 244 waiting for a video request event, an encryption request event, and a session status change event.

A video request event corresponds to a subscriber selecting video display parameters and activating the video control 314 on the participant's session status document 311. More specifically, the subscriber may utilize records 312 (and scroll control 315) to highlight multiple (up to four) records associated with participants that are providing video and then activate the video control 314. Scripting in the session status document 311 will provide the video request (that includes identification of the participants associated with the highlighted records) to the conference server application 244 in response to activation of video control 314.

An encryption request event corresponds to a subscriber activating the encryption control 319 on the session status document 311. In response to such activation, script in the session status document 311 will provide the encryption request to the conference server application 244.

A session status change event may be any of a participant entering a session (starting a VOIP session with the session client module 240), departing from a session (terminating a VOIP session with the session client module 240), muting participation in a session (continuing the session but providing nil audio and/or video), beginning or terminating the provision of motion video to the session client module 240, or beginning or terminating of encryption of a session with the session client module 240. Each session status change event may be reported to the conference server application 244 by the session client module 240 and will include an indication of the change event.

In response to a video request event, at step 274 the conference server application 244 will build a video display document and provide the video display document to the participant.

Figure 12B:
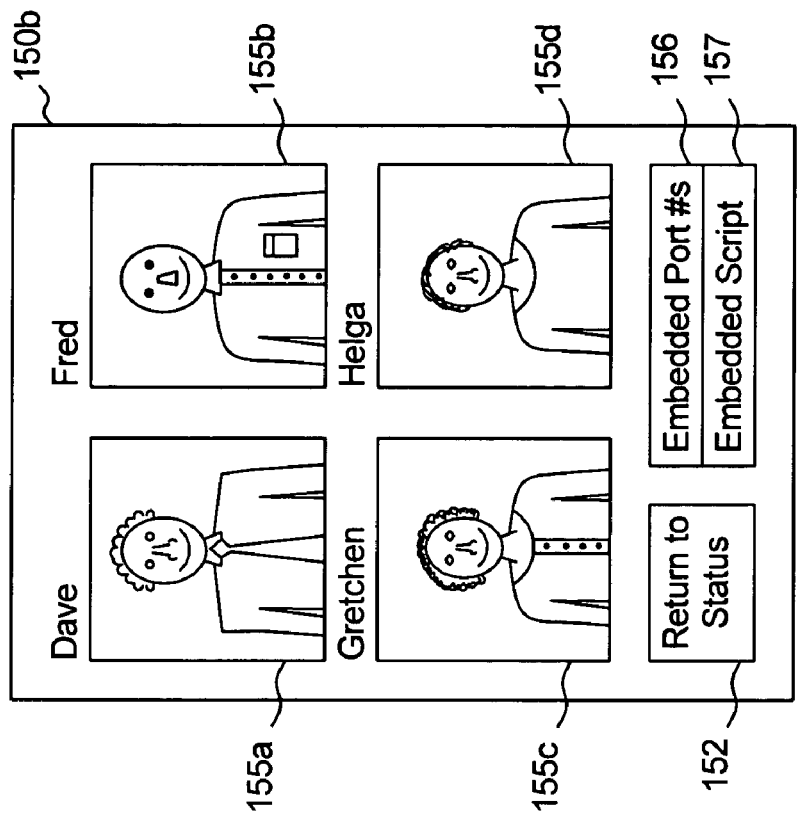
FIG. 12b represents an exemplary multi frame video display document.
Figure 12A:
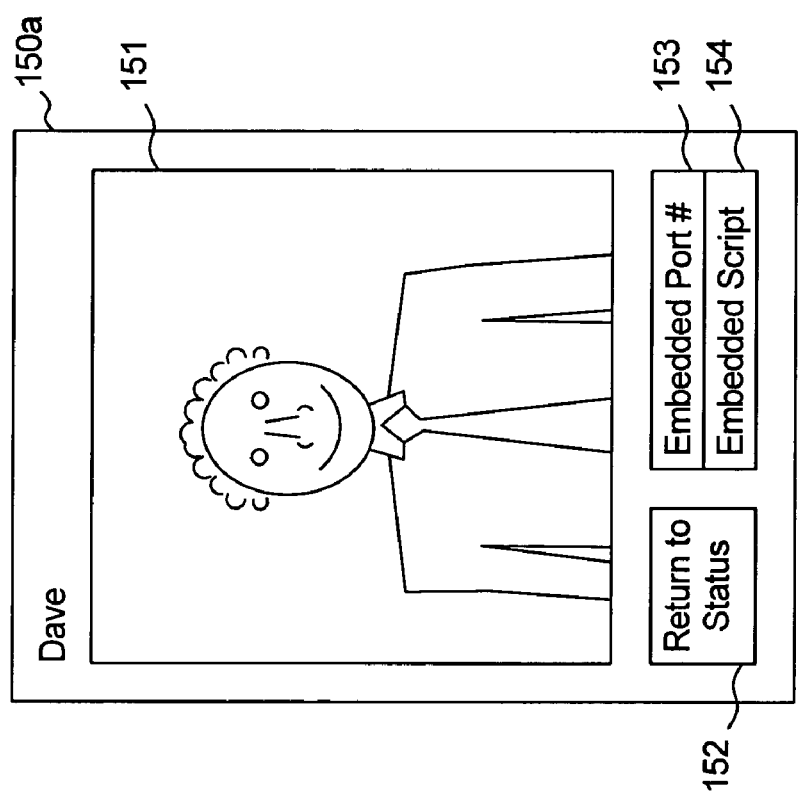
FIG. 12a represents an exemplary single frame video display document.

FIG. 12a represents a first video display document 150a that includes a video frame 151, a return to status document control 152, an embedded port number 153 that corresponds to the port number on which the session client module 240 has made the full motion video provided by the participant identified in the video request event available, and embedded scripting 154 that provides for the participant to connect to the port number 153 and display the motion video provided on the port within the frame 151. The return to status document control 152 includes embedded scripting such that upon activation, a request is sent to the conference server application 244 to obtain the session status document 311 as shown in FIG. 11b.

FIG. 12b represents a second video display document 150b that includes four video frames 155a-155d, a return to status document control 152, four embedded port numbers 156 that corresponds to the port numbers on which the session client module 240 has made the full motion video provided by the four participants identified in the video request event available, and embedded script 157 that provides for the participant to connect to each of the port numbers 156 and display the video provided on each port in one of the four frames 155a-155d. The return to status document control 152 includes embedded script such that upon activation, a request is sent to the conference server application 244 to again obtain the session status document 311 as shown in FIG. 11b.

Returning to FIG. 10, in response to an encryption event at step 278, the conference server application 244 will provide a signal to the session client module 240 to initiate encryption with each participant at step 282.

In response to a session status change at step 280, the conference server application 244 will update the status table 291 (FIG. 13) and each status display to correspond to the changed status at step 284 and will provided the updated session status document 311 to each participant.

Web Server

The web server application 230 provides multi media communication services to each subscriber which may include: a) updating of the network location table 245 to assure proper routing of incoming audio and audio/video calls; b) proxy communication over network 18; c) delivery of a multicast messages directed to a subscriber to the particular station 24 at which his or her subscriber device is then currently coupled; and d) providing a menu control for access to the conference server application 244 and the email module 228.

To perform such functions, the web server 230 includes a management application 226 and a multicast application 231. The flowcharts of FIGS. 14a through 14c represent exemplary operation of the management application 226.

Figure 14A:
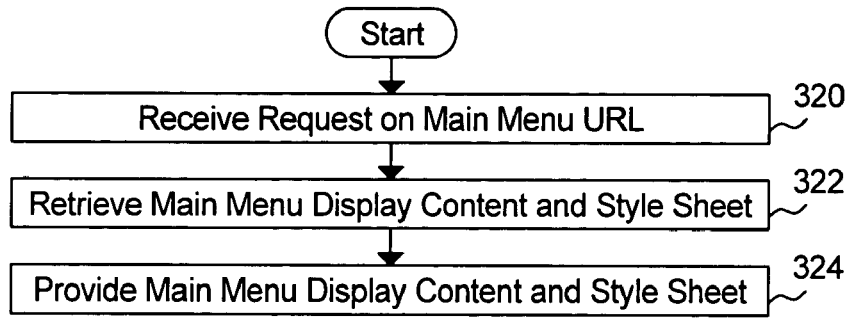
FIGS. 14a, 14b, and 14c are each flow charts that represent operation of a web server management application in accordance with one embodiment of the present invention.
Figure 14B:
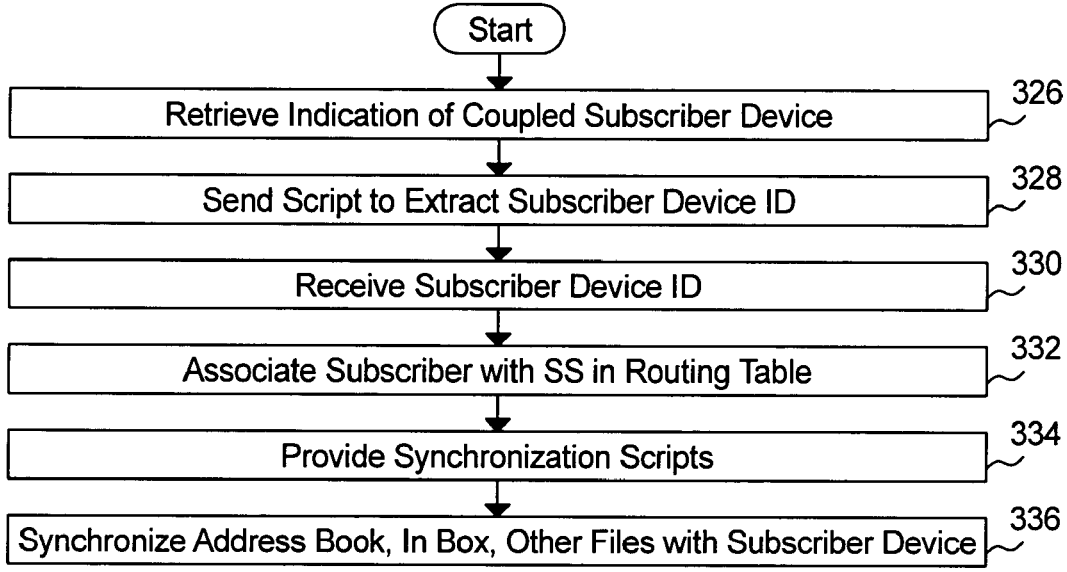
Figure 14C:
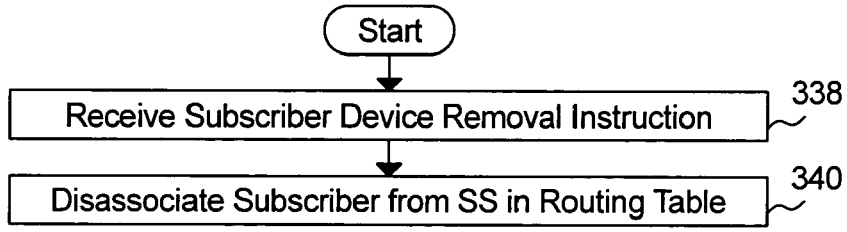

Referring to FIG. 14a, step 320 represents the web server 230 receiving an open session request from a telephony station 24 or a wireless telephony device 26 (device 24, 26) that has been operatively coupled to network 22 and is ready to operate as a client of the web server 230. The open session request may take the form of a frame sent by the device 24, 26 to a predetermined port number to open a TCP/IP session with the web server 230.

Step 322 represents retrieving a main menu document from document storage 241. The main menu document may be an HTML document or an XML document (e.g. content messages and display layout control messages) or other document format displayable on the device 24, 26. Step 324 represents providing the main menu document to the device 24, 26.

Figure 15:
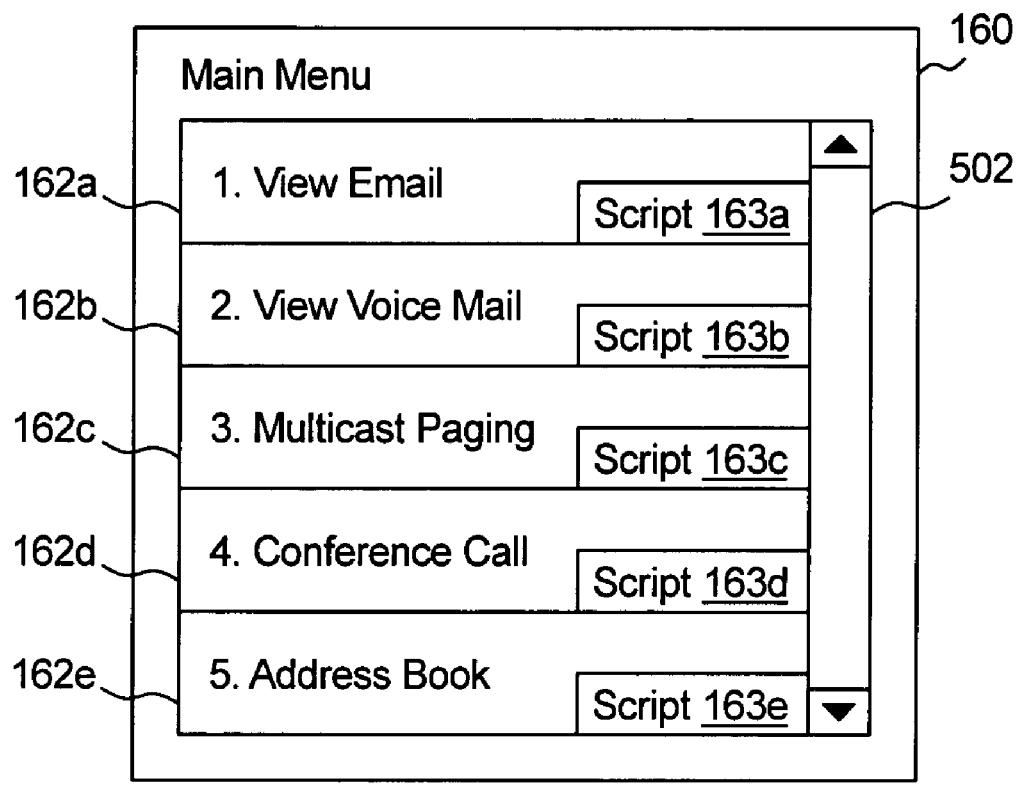
FIG. 15 represents an exemplary main menu display document.

FIG. 15 represents an exemplary main menu document 160. The main menu document 160 includes a plurality of subscriber activated controls 162 that may include an email control 162a, a voice mail control 162b, a multicast paging control 162c, a conference call control 162d, and an address book control 162e.

The email control 162a, the voice mail control 162b, and the address book control 162e each include script 163a, script 163b, and 163e respectively such that when activated, a message is provided to the email module 228 on a predetermined port number indicating such activation. The multicast paging control 162c may include script 163c such that when activated, a message is provided to the multicast application 231 on a predetermined port number indicating such activation. The conference call control 162d may include script 163d such that when activated, a message is provided to the conference server application 244 indicating such activation.

Referring to FIG. 14b, step 326 represents the management application 226 receiving an indication that a PDA 21 has coupled to a station 24 via the point-to-point communication module 62. The indication may take the form of a frame sent by the subscriber station 24 to a predetermined port number.

Step 328 represents the management application 226 providing script to the station 24 that provides for the station 24 to obtain the PDA device ID number associated with the PDA 21 and report the PDA ID number back to the management application 226. Step 330 represents receiving the PDA ID number.

Step 332 represents associating the PDA 21 with the station 24 in the routing table 245 by adding the PDA ID number to the record associated with the station 24.

Step 334 represents providing instructions to the station 24 to activate the subscriber device application 119 on the station 24 to initiate a link with the synchronization application 51 on the PDA 21 and step 336 represents synchronizing email records and contact records 104 in the PDA 21 with the email and contact records 247 in the control unit 12.

Referring to FIG. 14b, step 338 represents the management application 226 receiving an indication that a PDA 21 has de-coupled from a station 24. The indication may take the form of a frame sent by the station 24.

Step 340 represents dissociating the PDA 21 from the station 24 in the routing table 245.

Figure 17:
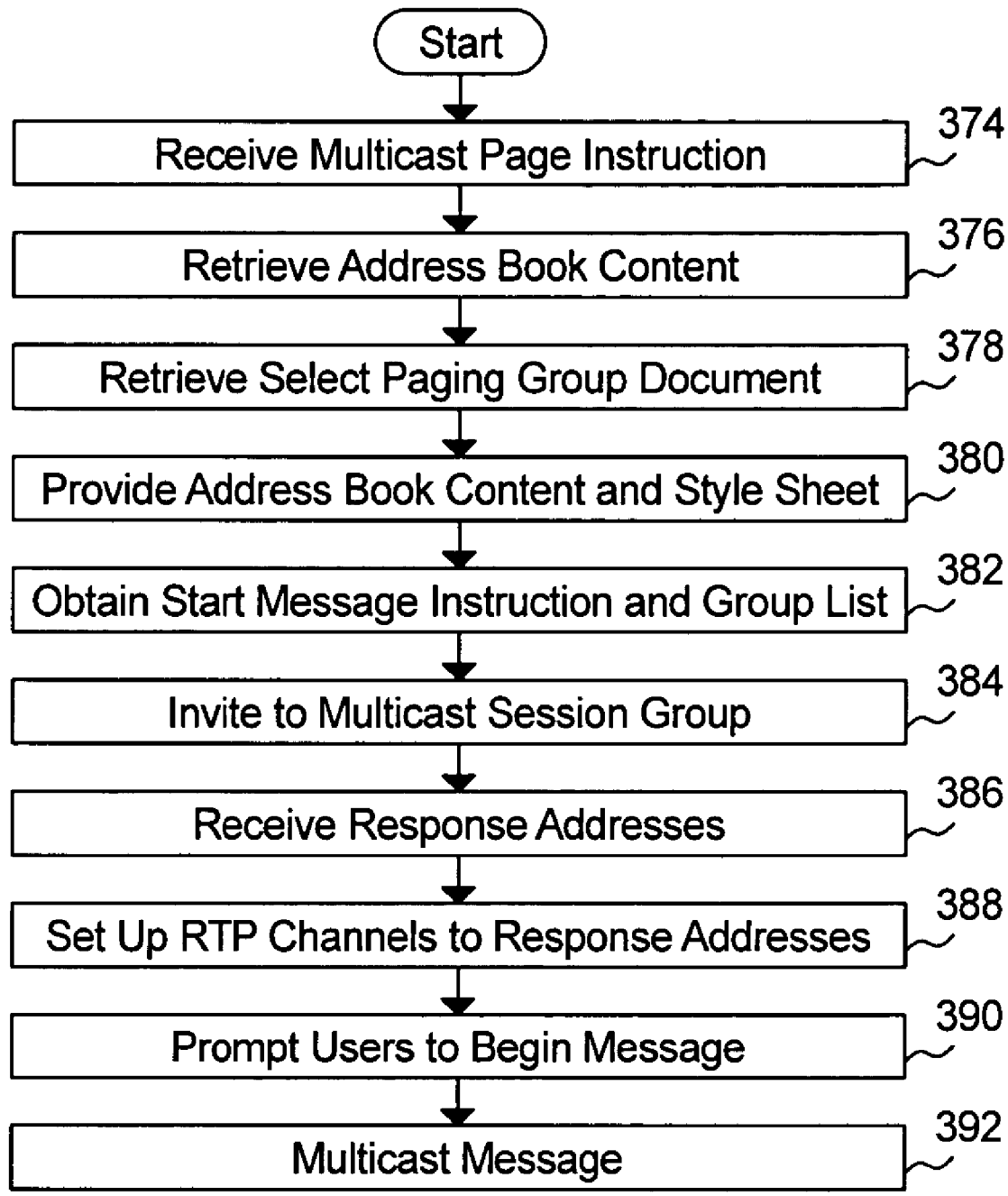
FIG. 17 is a flow chart representing exemplary operation of a multicast application in accordance with one embodiment of the present invention.

The flowchart of FIG. 17 represents steps performed by the multicast application 231 upon receiving a message indicating subscriber activation of the multicast control 162c. Step 374 represents receipt of such a message.

Step 376 represents retrieving the subscriber's address book content 249 from the email and contact records 247 and step 378 represents retrieving a select paging group document from document storage 241. Step 380 represents providing the select paging group document including the subscriber's address book content 249 to the station 24.

Figure 18:
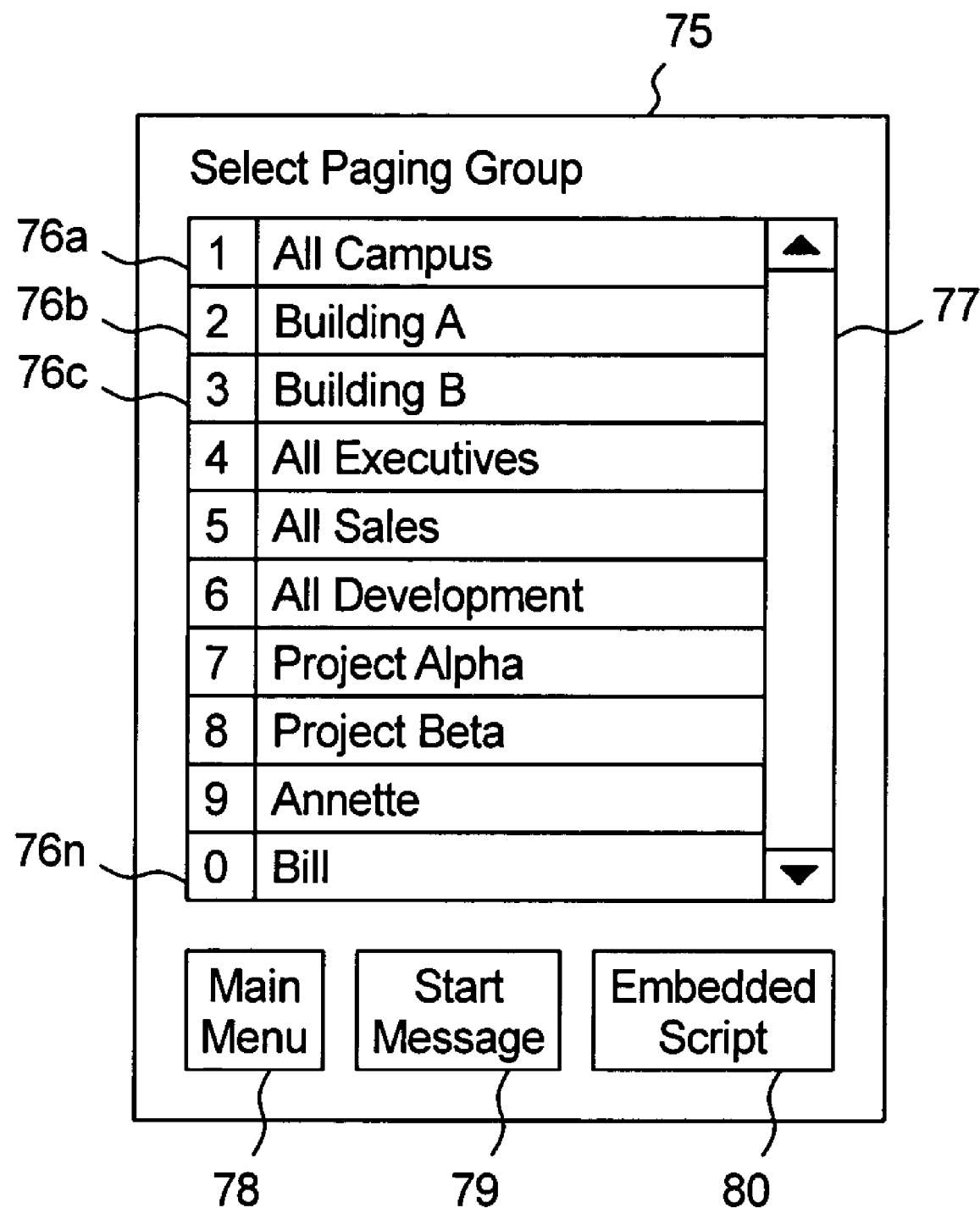
FIG. 18 represents an exemplary paging initiation document.

FIG. 18 represents an exemplary select paging group document 75. The document 75 includes a plurality of records 76 (that embody the address book content 249), a scroll control 77, a main menu return control 78, and a start message control 79. Each record 76 is associated with a paging group. Some paging groups may include only a single name such that individuals may be selected to include in the multicast page and some paging groups may include multiple individuals (or multiple sub groups). The document further includes embedded scripting 80 which enables the subscriber to select (using a highlight bar control and the scroll control 77) one or more groups for a multicast paging message. The start message control 79, includes embedded script that provides for identification of the selected paging groups to be provided to the multicast application 231 upon activation.

Returning to FIG. 17, step 382 represents receiving the identification of the selected paging groups. Step 384 represents obtaining a routing address for each selected group participant from the routing table 245 and step 386 represents sending a message to invite each group participant to the multicast session group using the routing address determined for each group participant at step 384. Step 386 represents receiving response messages from the group participants.

Step 388 represents set up of an RTP channels to each response address received from a group participant at step 386.

Step 390 represents prompting the initiating subscriber station 24 to begin the message and step 492 represents providing the message in multicast format on each RTP channel.

Voice Mail

Returning to FIG. 5, the voice mail module 236 includes VOIP client circuits for responding to the call signaling provided by the call signaling module 227, maintaining a VOIP session with an initiating VOIP endpoint, providing a sequence of RTP frames representing applicable audio prompts from compressed audio prompt files 233 to provide a typical voice mail experience to the operator of the initiating endpoint, to receive RTP frames from the initiating VOIP endpoint representing the remote caller leaving a message for the subscriber, and to compress the message into a digital audio file for storage. The voice mail message contained in the digital audio file can be retrieved in a traditional manner by calling into the voice mail server. Alternatively, the voice mail module 226 may send the digital audio file to the email module 228 for storage in the inbox 250 for later retrieval by the subscriber.

E-Mail

The email module 228 maintains an email account associated with each subscriber. The email module 228 includes client circuits for interfacing with a remote email server for receiving email messages for each subscriber and for storing in the subscriber inbox, and sends email messages drafted by the subscriber. The email module 228 also maintains the email files 247 in the storage 235 that may include the address book content 249 and the inbox 250 for each subscriber.

Figure 16B:
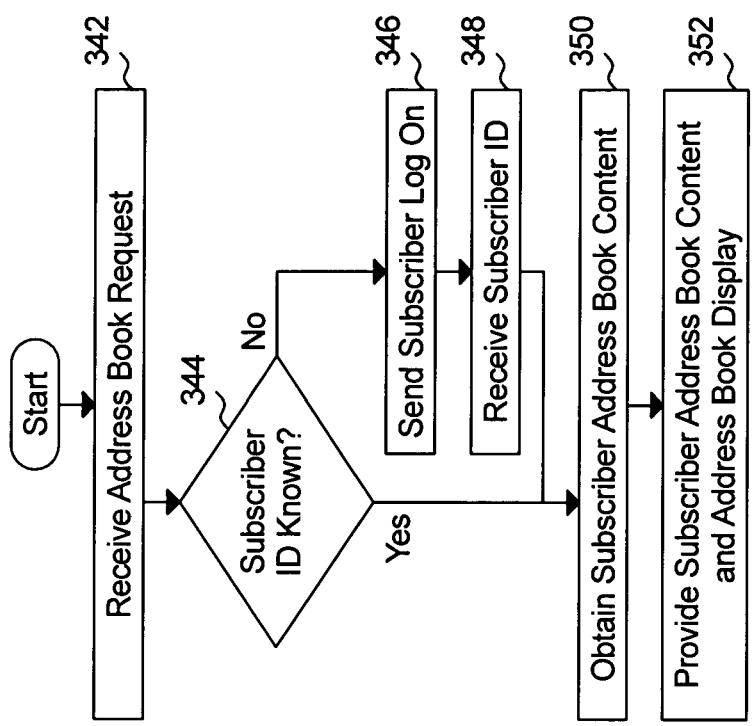
FIGS. 16a and 16b are each flow charts that represent exemplary operation of an email module.

The email module 228 may be any commercially available email server that supports inbox and address book functionality and provides client services through a web document interface. Because the main menu document 160 includes separate controls for voice mail, email, and address book, the flow charts of FIGS. 16a and 16b represents exemplary operation of the email module 228 upon receipt of a message indicating one of such controls from the main menu document 160.

Figure 16A:
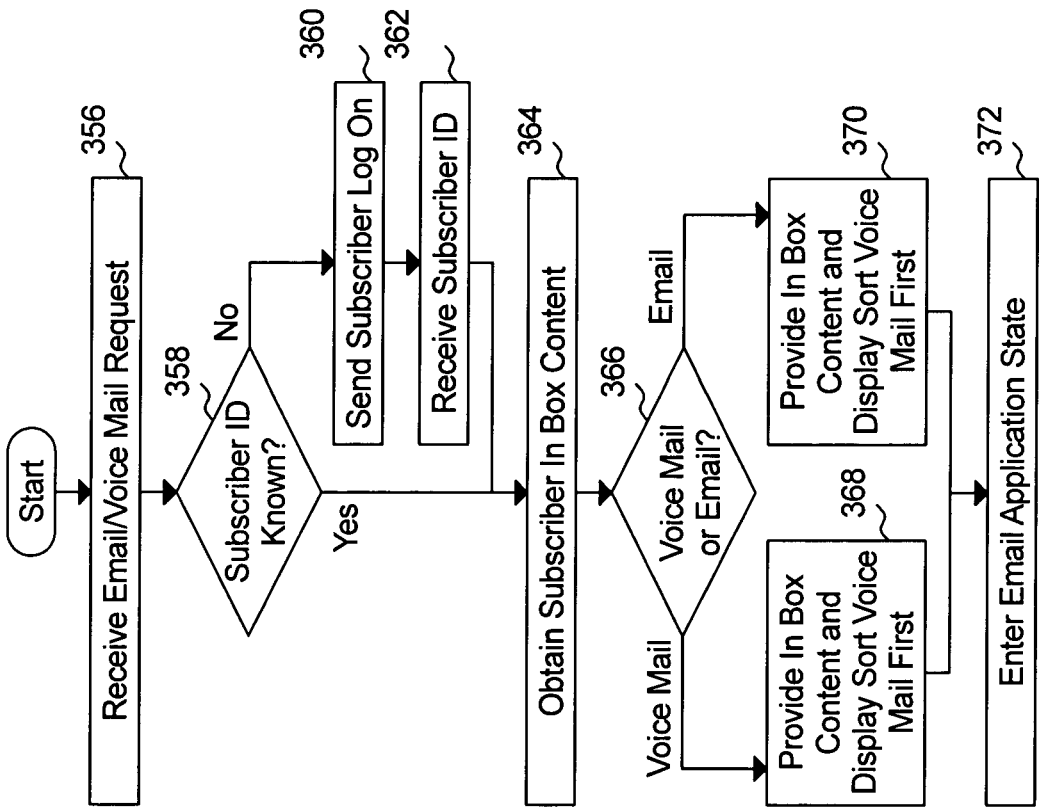

The flowchart of FIG. 16a represents steps performed by the email module 228 upon subscriber activation of the email control 162a or the voice mail control 162b. Step 356 represents receipt of a message indicating such activation from a subscriber station 24.

Step 358 represents a determination whether the identity of the subscriber at the subscriber station 24 is recorded in the routing table 245. If a PDA 21 is associated with the station 24 or if a subscriber is associated with the station 24 in the routing table 245, the system proceeds directly to step 364 wherein inbox content 250 associated with the subscriber is retrieved from the email and contact records 247. However, if a subscriber is not associated with the station 24 in the routing table 245, the system proceeds to step 260 wherein a logon screen is provided to the station 24 and a subscriber identifier is received from the station 24 at step 362. Then the system proceeds to step 364.

Step 366 represents a determination whether the subscriber activated the email control 162a or the voice mail control 162b. If the subscriber activated the email control 162a, the inbox content 250 is sorted such that email messages (messages other than those with voice mail attachments received from the voice mail server 236) are displayed at the top of the list at step 370. Alternatively, if the subscriber activated the voice mail control 162b, the inbox content is sorted such that the email messages that include voice mail attachments are displayed at the top of the list at step 368.

Step 372 represents retrieving a messaging document template from document storage 241 and providing a messaging document with the sorted inbox content 250 embedded with the messaging document template to the station 24.

The flowchart of FIG. 16b represents exemplary steps performed by the email module 228 upon receipt of a message, at step 342, indicating subscriber activation of the address book control 162e.

Step 344 represents a determination whether the identity of the subscriber at the subscriber station 24 is recorded in the routing table 245. If a PDA 21 is associated with the station 24 or if a subscriber is associated with the station 24 in the routing table 245, the system proceed directly to step 350 wherein address book content 249 associated with the subscriber is retrieved from the email and contact records 247. However, if a subscriber is not associated with the station 24 in the routing table 245, the system proceeds to step 346 wherein a logon screen is provided to the station 24 and a subscriber identifier is received from the station 24 at step 348. Then the system proceeds to step 350.

Step 352 represents retrieving an address book document template from document storage 241 and providing the address book content 249 embedded in the address book document template to the station 24.

CONCLUSION

It should be appreciated that the systems and methods of the present invention provides a simulated key switch private telephone system user experience in a VOIP environment. Although the invention has been shown and described with respect to certain preferred embodiments, it is obvious that equivalents and modifications will occur to others skilled in the art upon the reading and understanding of the specification. It is envisioned that after reading and understanding the present invention those skilled in the art may envision other processing states, events, and processing steps to further the objectives of the modular multi-media communication management system of the present invention. The present invention includes all such equivalents and modifications, and is limited only by the scope of the following claims.

What is claimed:

1. A communication management system for operation with a packet switched local area network, the communication management system comprising;
   a PSTN interface for communicating over a telephone line with a service provider central office;
   a network interface for communicating over the packet switched local area network with at least one real time communication device;
   a PSTN gateway comprising:
      means for establishing a logical channel over the packet switched local area network with a real time communication device in response to receiving session signaling that identifies a local area network address associated with the real time communication device, on a logical port associated with the telephone line;
      means for controlling the PSTN interface to transition the telephone line to an off hook state in response to receiving session signaling on a logical port associated with the telephone line;
      translation means for:
         providing digital audio over the logical channel, the digital audio representing a dial tone received on the telephone line from the central office; and
         providing one of a plurality of dual tone multi freguency signal on the telephone line in response to receipt of data from the real time communication device corresponding to the one of a plurality of dual tone multi freguency signals;
      means for receiving a session signaling message from the real time communication device that includes an identifier associated with the telephone line;
      means for determining a logical port associated with the telephone line;
      means for adding the logical port to a destination address of the session signaling message to generate a translated session signaling message; and
      means providing the session signaling message to the PSTN gateway on the logical port.

2. The communication management system of claim 1, wherein the data from the real time communication device corresponding to the one of a plurality of dual tone multi frequency signals is compressed digital audio data provided on the logical channel and representing at least one of an analog or digital audio representation of the tone generated at the real time communication device.

3. The communication management system of claim 1, wherein the data from the real time communication device corresponding to the one of a plurality of dual tone multi frequency signals is a message identifying the tone.

4. A communication management system for operation with a packet switched local area network, the communication management system comprising;
   a PSTN interface for communicating over at least two telephone lines with a service provider central office;
   a network interface for communicating over the packet switched local area network with at least one real time communication device;
   a PSTN gateway comprising:
      means for establishing a logical channel over the packet switched local area network with a real time communication device in response to receiving session signaling, that identifies a local area network address associated with the real time communication device, on one of a plurality of logical ports, each of which is associated with a unigue one of the at least two telephone lines;
      means for controlling the PSTN interface to transition the telephone line that is associated with the logical port on which session signaling was received to an off hook state;
      translation means for:
         providing digital audio over the logical channel, the digital audio representing a dial tone received from the central office on the telephone line associated with the logical port on which session signaling was received; and
         providing one of a plurality of dual tone multi freguency signal on the telephone line associated with the logical port on which session signaling was received in response to receipt of data from the real time communication device corresponding to the one of a plurality of dual tone multi freguency signals;

means for receiving a session signaling message from the real time communication device that includes an identifier that identifies a unique one of the at least two telephone lines;

means for determining a logical port associated with the unique one of the at least two telephone lines;

means for adding the logical port to a destination address of the session signaling message to generate a translated session signaling message; and means providing the session signaling message to the PSTN gateway on the logical port.

5. The communication management system of claim 4, wherein the data from the real time communication device corresponding to the one of a plurality of dual tone multi frequency signals is compressed digital audio data provided on the logical channel and representing at least one of an analog or digital audio representation of the tone generated at the real time communication device.

6. The communication management system of claim 4, wherein the data from the real time communication device corresponding to the one of a plurality of dual tone multi frequency signals is a message identifying the tone.

7. A method of operating a control unit to provide a communication interface between: i) a telephone line that is coupled between the control unit and a public switched telephone network (PSTN) service provider central office; and ii) a logical channel that is between the control unit and a real time communication device over a packet switched local area network, the method of operating the control unit comprising:

receiving session signaling, that identifies a local area network address associated with the initiating real time communication device, over the local area network on a logical port associated with the telephone line;

establishing a logical channel with the real time communication device over the local area network in response to receiving session signaling;

transitioning the telephone line to an off hook state;

providing digital audio over the logical channel, the digital audio representing a dial tone received on the telephone line from the central office; and providing one of a plurality of dual tone multi frequency signals on the telephone line in response to receipt of data from the real time communication device corresponding to the one of a plurality of dual tone multi frequency signals;

receiving a session signaling message from the real time communication device that includes an identifier associated with the telephone line;

determining a logical port associated with the telephone line;

adding the logical port to a destination address of the session signaling message to generate a translated session signaling message; and providing the session signaling message to the PSTN gateway on the logical port.

8. The method of claim 7, wherein the step of providing one of a plurality of dual tone multi frequency signals on the telephone line comprises:

providing one of a plurality of dual tone multi frequency signals on the telephone line by decompressing compressed digital audio data provided on the logical channel and representing generation of the dual tone multi frequency signal at the real time communication device.

9. The method of claim 8, wherein the step of providing one of a plurality of dual tone multi frequency signals on the telephone line comprises:

providing one of a plurality of dual tone multi frequency signals on the telephone line in response to receipt of a message from the real time communication device identifying the tone.

10. A method of operating a control unit to provide a communication interface between: i) at least two telenhone lines that are coupled between the control unit and a public switched telephone network (PSTN) service provider central office; and ii) a logical channel that is between the control unit and a real time communication device over a packet switched local area network, the method comprising:

receiving session signaling, that identifies a local area network address associated with the real time communication device, over the local area network on one of a plurality of logical ports, each of which is associated with a unique on of the at least two telephone lines;

establishing a logical channel over the packet switched local area network with a real time communication device in response to receiving session signaling;

transitioning the telephone line that is associated with the logical port on which session signaling was received to an off hook state;

providing digital audio over the logical channel, the digital audio representing a dial tone received from the central office on the telephone line associated with the logical port on which session signaling was received; and providing one of a plurality of dual tone multi frequency signals on the telephone line associated with the logical port on which session signaling was received in response to receipt of data from the real time communication device corresponding to the one of a plurality of dual tone multi frequency signals;

receiving a session signaling message from the real time communication device that includes an identifier that identifies a unique one of the at least two telephone lines;

determining a logical port associated with the unique one of the at least two telephone lines;

adding the logical port to a destination address of the session signaling message to generate a translated session signaling message; and providing the session signaling message on the logical port.

11. The method of claim 10, wherein the step of providing one of a plurality of dual tone multi frequency signals on the telephone line comprises:

providing one of a plurality of dual tone multi frequency signals on the telephone line by decompressing compressed digital audio data provided on the logical channel and representing generation of the dual tone multi frequency signal at the real time communication device.

12. The method of claim 10, wherein the step of providing one of a plurality of dual tone multi frequency signals on the telephone line comprises:

providing one of a plurality of dual tone multi frequency signals on the telephone line in response to receipt of a message from the real time communication device identifying the tone.

* * * * *